US008288170B2

(12) United States Patent
Tai et al.

(10) Patent No.: US 8,288,170 B2
(45) Date of Patent: ＊Oct. 16, 2012

(54) USES OF PARYLENE MEMBRANE FILTERS

(75) Inventors: Yu-Chong Tai, Pasadena, CA (US);
Siyang Zheng, Pasadena, CA (US);
Henry Lin, San Marino, CA (US); Ram Datar, Alhambra, CA (US); Richard Cote, Los Angeles, CA (US)

(73) Assignees: California Institute of Technology, Pasadena, CA (US); University of Southern California, Los Angeles, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/943,891

(22) Filed: Nov. 10, 2010

(65) Prior Publication Data

US 2011/0111412 A1    May 12, 2011

Related U.S. Application Data

(63) Continuation of application No. 11/408,501, filed on Apr. 20, 2006, now Pat. No. 7,846,393, and a continuation of application No. 11/408,499, filed on Apr. 20, 2006, now Pat. No. 7,846,743.

(60) Provisional application No. 60/673,571, filed on Apr. 21, 2005.

(51) Int. Cl.
*G01N 1/18* (2006.01)

(52) U.S. Cl. .................. 436/177; 210/490; 210/500.26; 210/506; 210/500.23; 422/402; 422/422

(58) Field of Classification Search .................... 422/61
See application file for complete search history.

(56) References Cited

U.S. PATENT DOCUMENTS

| 5,804,366 | A | 9/1998 | Hu et al. |
| 6,177,019 | B1 | 1/2001 | Castino et al. |
| 6,464,337 | B2 | 10/2002 | Roy et al. |
| 6,598,750 | B2 | 7/2003 | Tai et al. |
| 6,622,872 | B1 | 9/2003 | Tai et al. |
| 7,655,075 | B2 * | 2/2010 | Hofmann ........................ 96/4 |
| 7,846,743 | B2 * | 12/2010 | Tai et al. ...................... 436/177 |
| 7,919,178 | B2 | 4/2011 | Charkudian et al. |
| 2005/0135455 | A1 | 6/2005 | Peeters et al. |

(Continued)

FOREIGN PATENT DOCUMENTS

WO    WO 99/24141 A1    5/1999

OTHER PUBLICATIONS

International Search Report mailed on Sep. 14, 2006, for International Patent Application No. PCT/US06/15501, filed on Apr. 21, 2006, 1 page.

(Continued)

*Primary Examiner* — Sally Merkling
(74) *Attorney, Agent, or Firm* — Kilpatrick, Townsend and Stockton LLP

(57) ABSTRACT

The invention provides parylene membrane filters, filter devices and methods of making them and using them in the mechanical separation of cells and particles by size. The provision of parylene membrane filters with high figures of merit and finely controlled hole sizes allows the separation of cells and particles in a variety of biological and other fluids according to sizes.

14 Claims, 9 Drawing Sheets

U.S. PATENT DOCUMENTS

| | | |
|---|---|---|
| 2006/0007983 A1 | 1/2006 | Tai et al. |
| 2006/0204699 A1 | 9/2006 | Maltezos et al. |
| 2007/0000838 A1 | 1/2007 | Shih et al. |

OTHER PUBLICATIONS

Kahn, H.J. et al., "Enumeration of circulating tumor cells in the blood of breast cancer patients after filtration enrichment: correlation with disease stage," *Breast Cancer Research and Treatment*, 2004, vol. 86, pp. 237-247.

Pietersz, R.N.I., et al., "Update on Leucocyte Depletion of Blood Components by Filtration," Dec. 1998, Transfus Sci., vol. 19, No. 4, 321-328.

Japanese Office Action dated Jun. 23, 2011 filed in related Japanese Application No. 2008-507986.

* cited by examiner

USES OF PARYLENE MEMBRANE FILTERS

CROSS-REFERENCES TO RELATED APPLICATIONS

This application is a continuation of U.S. application Ser. Nos. 11/408,499, filed Apr. 20, 2006, and 11/408,501, filed Apr. 20, 2006, which both claim priority to U.S. Provisional Patent Application No. 60/673,571, filed Apr. 21, 2005, which are hereby incorporated by reference in its entirety for all purposes.

FIELD OF THE INVENTION

This invention relates to polymeric membranes useful in the mechanical filtration of particles and cells in a fluid.

BACKGROUND OF THE INVENTION

A mechanical filter can be used to remove, filter, collect, concentrate and analyze particles and cells in a variety of fluid medium.

The filtration of cells can aid in the diagnosis of disease. For instance, one of the most important determinants of prognosis and management of cancer is the absence or presence of metastatic dissemination of tumor cells at the time of initial presentation and during treatment. The early spread of tumor cells to lymph nodes or bone marrow is referred to as circulating tumor cells (CTC) when in the peripheral blood. It has been well established that these CTC can be present even in patients who have undergone complete removal of the primary tumor. The detection of CTC has proven to be a useful tool in determining the likelihood of disease progression. Similarly, the ability to detect, collect, or obtain other kinds of cells (e.g., bacterial cells, immune system cells, fetal cells) found in biological fluids by filtration methods will be of great clinical value both in diagnostics and therapeutics.

Further, with respect to blood and CTC, the predominance of the red blood cell can make it difficult to detect or obtain cells found in blood at much lower levels. CTC exist in blood on the order of 1 per 10 billion blood cells. Currently available technologies are inadequate to identify circulating tumor cells with the requisite sensitivity, efficiency and specificity. Existing technologies using magnetic beads, density-gradient centrifugation or polycarbonate filtration for the capturing of tumor cells typically have poor recovery rates and extended processing time in the order of hours.

One way of separating cells is by size. Many research groups have reported cell separation using mechanical filtering. For example, it was demonstrated a weir-type filter with a 3.5µ gap could isolate leukocytes with a 7% capturing efficiency and >99% erythrocyte rejection (see, Wilding P, et al., *Anal Biochem.* 257(2):95-100 (1988); Yuen P K, et al., *Genome Res.* 11(3):405-12 (2001); and Mohamed H, et al., *IEEE Trans Nanobioscience* 3(4):251-6 (2004). This work indicated an attractive advantage of such devices in obviatin the need to formulate a special buffer condition for separation. More work was, however, warranted to improve the capturing efficiency.

The mechanical filtration method can be applied to circulating tumor cells in blood as these blood cells can substantially differ in size from other major cell types found in blood:

| Cell Culture | Tumor Type | Approximate size in µ |
|---|---|---|
| MDA-468 | Breast | NA |
| MCF-7 | Breast | 21 ± 2* |
| J82 | Bladder | 16 ± 2 |
| T24 | Bladder | NA |
| PC3 | Prostate | NA |
| LNCaP | Prostate | 23 ± 2* |
| Peripheral Blood Lymphocytes | | 12 ± 2* |

Variability of cell sizes across different cultured tumor cells PBL: peripheral blood lymphocytes (see, Vona G, et al., *Am J Pathol.* 156(1): 57-63 (2000)

To handle large sample volumes, as may be required when only a few cancer cells of interest my exist in a large blood volume, a membrane filter needs a large throughput capability. Several groups have demonstrated separation of tumor cells from whole blood with commercially available polycarbonate filters (see, Vona G, et al., *Am J Pathol.* 160(1):51-8 (2002); Kahn H J, et al., *Breast Cancer Res Treat;* 86(3):237-47 (2004)). However, the existing commercial membrane filters which have been used to mechanically filter blood have low recovery rates. Such filters frequently contain randomly and sparsely distributed holes, with many of them noticeably fused, resulting in large openings that can contribute to lower recovery rates.

Micromachined membrane filters, which have precise geometrical and thickness control, can have better performance. The opening factor can be large and without the defects of fused doublet or triplet holes. Previously, we have demonstrated the manufacture and use of a silicon nitride/parylene membrane filter to separate particles. The particle membrane filters (8×8 mm$^2$) have circular, hexagonal or rectangular through holes. By varying hole dimensions from 6 to 12 µm, opening factors from 4 to 45% were achieved (see, U.S. Patent Application Publication No. US2001/0019029).

Therefore, there is a need for an improved filtration system which can be used to remove, isolate, capture or detect a cell or other particle in blood or other body fluids. This invention provides for these and other needs.

BRIEF SUMMARY OF THE INVENTION

In a first aspect, the present invention provides novel membrane filters comprising a parylene substrate and filter devices housing the parylene membrane filter. Advantageously, the membrane filters and devices can provide a highly efficient means for capturing or trapping particles and cells according to their size and shape. For instance, low concentrations of circulating tumor cells (CTC) in blood can be trapped in a parylene membrane filter having suitably sized holes which bar the passage of a CTC while allowing red blood cells to pass through. In a second aspect, the invention provides methods of using the parylene membrane filters and filter devices to capture or isolate particles and cells.

Accordingly, in the first aspect, the invention provides a parylene membrane filter. The parylene membrane of the filter is made of a substrate comprising a parylene polymer. In a preferred embodiment, the parylene membrane is deposited through a highly-conformal vapor deposition process. Suitable types of parylene include parylene C, F, A, AM, N, and D, as well as those further described herein.

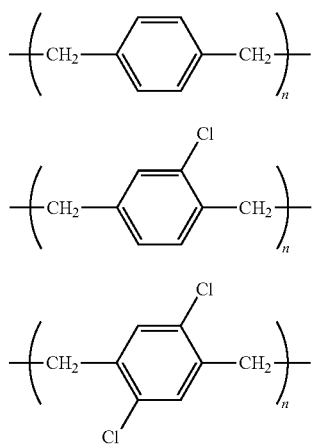

Parylene N

Parylene C

Parylene D

The parylene membrane filter comprises a plurality of holes of a predetermined geometric design formed in, and penetrating, the thickness of the parylene membrane. The geometric design includes, for example, a size, a shape and density. In one embodiment, the design of the membrane is such that CTC are selectively captured or retained by the membrane while other cells and materials in the blood pass through the membrane selected according to their size and shape. The efficiency of the membrane filter can be optimized by adjusting the size, shape and density of the holes on the membrane. The predetermined geometric design is according to any one or more of the size, shape, density, uniformity, and arrangement of the holes in the parylene membrane. In some embodiments of the above, the parylene membrane filter is from 0.5 to 20 microns thick.

The invention also provides membrane filter devices. These devices comprise a parylene membrane filter as described above and a housing in which the parylene membrane filter is mounted. In some embodiments, the device comprises a first chamber and a second chamber separated by the parylene membrane filter. In some embodiments, the parylene membrane filter substrate is in contact with a metal layer on an external surface. In some embodiments, the membrane filter device has a plurality of parylene membrane filters having an array of holes which may be of the same or different predetermined geometric design.

According to a second aspect of the present invention, a method of forming a parylene membrane filter and a parylene membrane filter device is provided. The method typically includes the formation of a parylene membrane having an array of holes with a predetermined geometric design and the assembly of the membrane in a housing. The predetermined geometric design includes the precisely controlled size, shape and density of the holes. In one embodiment, the geometric design includes an array of monodispersed holes.

In a third aspect, the invention is drawn to methods of using the parylene membrane filters according to the invention to isolate particles or cells. In this aspect, the invention provides a method for isolating a particle or cell by obtaining a sample containing the particle or cell and passing the sample through a parylene membrane filter. The size and shape of the holes can be determined empirically, for example, by determining the ability of the holes to control the passage through the membrane of the particle or cell or of particles or cells of similar size and shape to the cell to be isolated.

In any of the above embodiments, the isolated cell may be further used or manipulated. For instance, the isolated cells may be detected, counted, cultured, characterized, concentrated, or obtained for further use (e.g., administration in a cell-based therapy).

In further embodiments, the invention provides methods for monitoring the health status of a patient having a disease caused by a harmful cell by obtaining a sample of a body fluid containing the harmful cell and isolating the harmful cell by passing the sample through a membrane filter having a parylene substrate having a plurality of holes of a predetermined geometric design; and detecting the isolated harmful cell.

In some embodiments, the invention provides methods for monitoring the health status of a patient having a disease caused by a deficiency of a beneficial cell by obtaining a sample of a body fluid containing the beneficial cell and isolating the beneficial cell by passing the sample through a membrane filter having a parylene substrate having a plurality of holes of a predetermined geometric design; and detecting the isolated beneficial cell.

In another set of embodiments, the invention provides methods for evaluating the therapeutic efficacy of a treatment for a condition caused by a harmful cell, the method comprising obtaining a sample of a body fluid containing the harmful cell during or after the treatment; and isolating the harmful cell by passing the sample through a membrane filter having a parylene substrate fluid having a plurality of holes of a predetermined geometric design; and detecting the retained harmful cell in the sample.

In some embodiments, an insoluble particle is isolated from a sample. The sample may be obtained from a living organism, or from the environment (air, water, soil), or an article of human manufacture. The particle may be asbestos, uric acid crystals, a crystal, or an amorphous solid. The isolated particle may then be counted or characterized.

In some embodiments, the invention provides a method of removing particulate contaminants from a fluid by passing the sample through a membrane filter comprising a parylene substrate according to the invention. The fluid may be a culture medium, or a drinking water, a medicine or substance for administration to a human by any route of administration (e.g., oral, intravenous, inhalation).

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1A shows a parylene film with 50 devices. FIGS. 1B and 1C show portions of one of the 50 devices.

FIG. 4 illustrates images of scanning electron microscope (SEM) of a commercial membrane filter and the membrane filters of the present invention.

DETAILED DESCRIPTION

Figure 1:
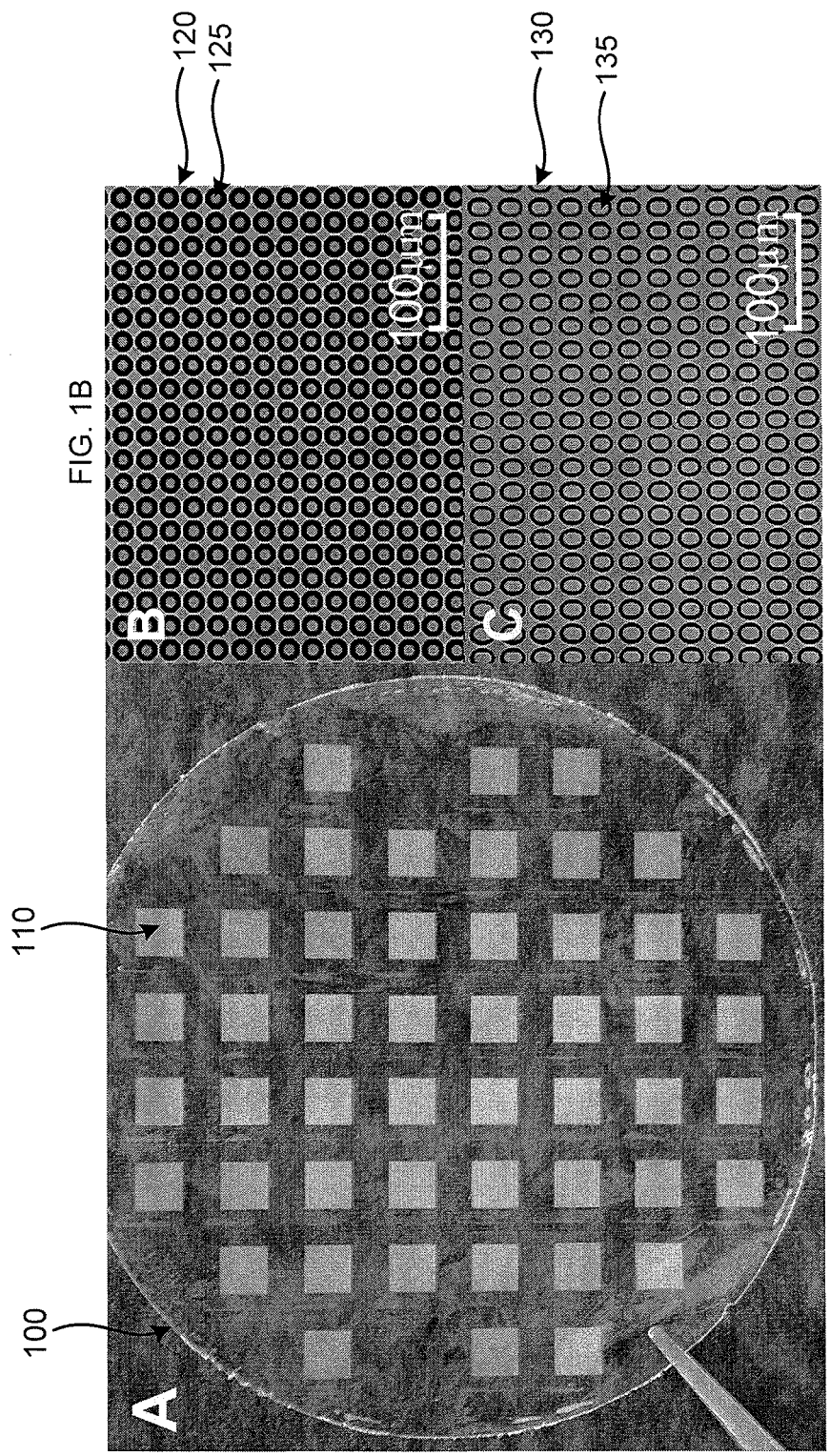
FIG. 1 illustrates a fabricated membrane filter device.

It is noted here that as used in this specification and the appended claims, the singular forms "a," "an," and "the" include plural reference unless the context clearly dictates otherwise.

This invention provides novel parylene membrane filters and devices, including microdevices. It further provides methods of their use in the capture, isolation, detection, and/or characterization of cells and/or particles. Accordingly, in some embodiments, the invention provides parylene membrane filtration devices, which comprise the parylene membrane filter and a housing. Advantageously, the parylene membrane filter allows the filtration of many fluids, including, biological fluids.

The parylene membrane filters and devices can provide a highly efficient means for capturing or trapping particles and cells in fluids according to their size and shape. For instance, low concentrations of circulating tumor cells (CTC) in blood can be trapped in a parylene membrane filter having suitably sized holes which bar the passage of a CTC while allowing red blood cells to pass through.

As described below, the parylene membrane filters and devices have already demonstrated greater than 80% recovery with high enrichment factor, which out-performs most current methods used in the field. Moreover, less than 10 minutes can be required for each CTC capture operation, compared to current multi-step processing requiring more than an hour. The invention has been advantageously demonstrated as an enrichment device or cell capture device by using a model system using cultured cancer cells admixed in blood. The novel parylene membrane filters and devices can provide a cost effective method for CTC monitoring with higher recovery rate, faster processing and more reliable results due to minimal human intervention.

The parylene membrane filter is made of a substrate which comprises, consists essentially of, or consists of parylene as defined further below. Suitable parylenes include USP Class VI biocompatible polymers. In a preferred embodiment, the parylene membrane is deposited through a highly-conformal vapor deposition process. Suitable types of parylene specifically include parylene C, F, A, AM, N, and D, as well as those further described herein.

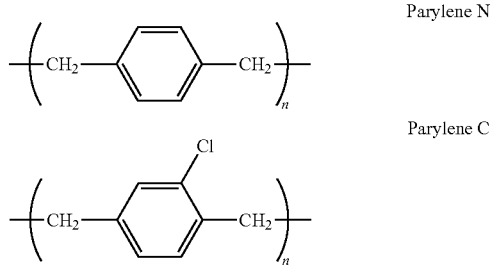

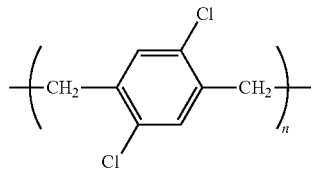

The parylene membrane filter comprises a plurality of holes of a predetermined geometric design formed in, and penetrating, the parylene membrane. The geometric design includes, for example, a size, a shape and density. In one embodiment, the design of the membrane is such that CTC are selectively captured or retained by the membrane while other cells and materials in the blood pass through the membrane selected according to their size and shape. The efficiency of the membrane filter can be adjusted by changing the size, shape and density of the holes on the membrane. In some preferred embodiments, the filter of the present invention has a figure of merit up to 890. In other embodiments, the parylene membrane filter has a figure of merit between about 800 to about 890. In preferred embodiments, the holes are monodispersed.

The predetermined geometric design is according to any one or more of the size, shape, density, uniformity, and arrangement of the holes in the parylene membrane. In some embodiments, the holes themselves can have rounded or sharp corners. The holes can be of a regular shape (e.g., circles, ovals, ellipses, squares, rectangles, symmetrical and unsymmetrical polygons, rods) or any other shape desired, including but not limited to, other irregular shapes. The holes can be of different sizes and shapes. The holes can all be of uniform size and/or shape. In preferred embodiments, the holes may be limited to a predetermined range of sizes and/or shapes. In some embodiments, membrane filter has a hole shape selected from the group consisting of a circular, an elliptical, a symmetrical polygonal, an unsymmetrical polygonal, an irregular shape and combinations thereof. In some embodiments, the holes can be arranged in a uniform grid or array (e.g., one or more rows and/or columns, concentric circles, and the like). Preferably, holes are all of the same shape and size and may also be of uniform density or pattern on the membrane, aside from the edges. The size and shape of the holes can be determined empirically, for example, by determining the ability of the holes to control the passage through the membrane of the particle or cell or of particles or cells of similar size and shape to the cell to be isolated.

Accordingly, the holes may be of any size and shape which will determine the ability of a particle or cell of interest to pass through. For instance, in some embodiments, the holes may have a minimum or maximum cross sectional length of 1, 2, 3, 4, 5, 8, 10, 12, 14, 16, 18, 20, 24, 28, 30, 32, 36, 40, 45, or 50 microns. In some embodiments, the holes are circles, ovals, or polygons. In some further embodiments, the circular holes have diameters of 2, 4, 8, 10, 14, 20, 30, 40 or 50 microns. In other further embodiments, the holes are oval and have different lengths and widths which may be independently be selected from 2, 4, 6, 8, 10, 14, 20, 30, 40 or 50 microns. For instance, in some further embodiments, the holes may be circles from 6 to 10, 5 to 12, 10 to 20, 8 to 40, or 6 to 60 microns in diameter. In other embodiments, the holes may be ovals whose dimensions are from 4 to 10 microns by 11 by 20 microns, from 8 to 20 microns by 8 to 20 microns, by 8 to 20 microns by 8 to 40 microns, or by 8 to 80 microns by 8 to 80 microns. In some embodiments of any of the above, the minimum width of hole is 2, 4, 6, 8, or 10 microns. In some embodiments, of any of the above the maximum length of the hole is 50, 100 microns or 200 microns.

The holes may also be defined according to their cross sectional area and/or shape. The shapes can be as any described above. In some embodiments, the cross sectional areas range from about 1 to 1000 square microns, 1 to 10 square microns, 10 to 100 square microns, 25 to 500 square microns, 50 to 400 square microns, 75 to 150 square microns, 75 to about 500 square microns, or 200 to 1000 square microns. In any of the above, the holes may be monodispersed. In any of the above, the parylene membrane filter may have a figure of merit up to 890, and preferably from 800 to 890.

In some embodiments, the parylene membrane filter has a hole density of from 5,000 to 40,000; 10,000 to 40,000; 10,000 to 30,000; 20,000 to 30,000; 20,000 to 40,000; or 30,000 to 40,000 holes per square millimeter. Such hole densities depend in part upon the sizes of the holes, with smaller holes allowing for greater densities. The densities can be adjusted so as to insure that the holes do not fuse together during manufacture and the strength of the parylene membrane remains suitable. A thicker membrane can be used to strengthen the membrane at higher hole densities.

In certain instances, the number and size of the holes affects the rate at which a sample can pass through the membrane and the strength of the membrane. The density of the holes will typically range from 1,000 to 40,000 holes per square millimeter. The plurality of holes can provide an opening area ratio of from 4% to 60%, including ranges from 4% to 25%, 5% to 25%, 10% to 25%, 15% to 30%, 5% to 45%, 10% to 50%, 15% to 45%, 20% to 40%, 25% to 50%, and 45% to 60%.

In some embodiments of the above, the parylene membrane filter is from 0.5 to 20 microns thick. In preferred embodiments, the membrane is at least 1 micron thick. In other embodiments, the membrane filter is from 1 to 10 microns thick, in more preferred embodiments, the membrane filter is from 1 to 4 microns thick. The thickness of the membrane filter is a compromise between membrane strength and flow resistance through the membrane. Accordingly, as increasing hole density reduces membrane strength, membranes having a greater number of holes typically require a thicker membrane than membranes having a fewer number of the same holes.

In some embodiments of the above, the parylene membrane filter itself or membrane filter surface area is provided in various sizes and shapes. The membrane filter or each filtering surface of the membrane can be in the form of a circle, oval, symmetrical or asymmetrical polygon, square rectangle, or an irregular shape. The membrane filter or each filtering surface of the membrane may have a surface area from 4 square millimeters to 10 square centimeter, from 10 square millimeters to 100 square millimeters, from 25 square millimeters to 625 square millimeters, or from 25 square millimeters to 250 square millimeters, or from 25 square millimeters to 100 square millimeters. The cross section of the membrane filter or filter surface portion thereof in part is governed or in accordance with the amount of fluid to be filtered, the concentration of the retained particles or cells in the fluid, the pressure to be applied, and the strength of thickness of the membrane. In some instances, the membrane filters may be mounted separately in a housing and in parallel.

The invention also provides membrane filter devices. These devices comprise a parylene membrane filter as described above and a housing in which the parylene membrane filter is mounted. In some embodiments, the device comprises a first chamber and a second chamber separated by the parylene membrane filter. In some embodiments, the parylene membrane filter substrate is in contact with an external metal layer. In some further embodiments, the metal is selected from the group consisting of Au, Pt, Ag, Pd, Cu, Ir, Zn, Ni, Fe, Ru, Rh and Si. In some embodiments, the metal does not comprise Si.

In some embodiments, the membrane filter device has a plurality of parylene membrane filters having an array of holes which may be of the same or different predetermined geometric design. For example, the first membrane filter may have a circular hole and the second membrane filter an oval hole. In some embodiments, the plurality of parylene membrane filters are disposed substantially in parallel. The device may have one or more stacks of multiple membrane filters. In some preferred embodiments, the plurality of parylene membrane filters are disposed sequentially in a housing. For instance, the filter device may comprise first parylene membrane filter having an array of holes with a first predetermined geometric design; and a second parylene membrane filter having an array of holes with a second predetermined geometric design, wherein the first membrane filter is disposed above said second membrane filter. In some embodiments, the device may further comprise a sandwich layer disposed between said first membrane filter and said second membrane filter. The sandwich layer may be an inert layer. In some embodiments, the sandwich layer does not comprise Si.

According to a second aspect of the present invention, a method for forming a parylene membrane filter and a parylene membrane filter device is provided. The method typically includes the formation of an array of holes with a predetermined geometric design in an area of a parylene membrane and the assembly of the membrane in a housing. The predetermined geometric design includes the precisely controlled size, shape and density of the holes. In one embodiment, the geometric design includes an array of monodispersed holes.

This fabrication process can be used for various membrane filters. The preferred hole shapes include circular, hexagonal, and/or rectangular. Filters as large as 8 by 8 square millimeters can be fabricated. Other factors being constant, the opening area ratio increases as the hole size increases. The hole size also defines the filtering threshold—the minimum size of the particles that can be blocked by the filter.

For example, a filter with a 10.6 micron diameter hole has an opening area ratio of approximately 12½%. Hexagonal holes can provide higher opening area ratios, but provide corners which cause higher stress concentration in the membrane. This effectively reduces the strength of the filter. Rectangular holes can provide a large range of opening area ratio without changing the filtering threshold. In some embodiments, one dimension of the rectangular holes must be kept constant.

It is now possible to fabricate complex miniaturized systems or "microdevices." This technology represents a combination of several disciplines that include microfabrication, microfluidics, microelectronmechanical systems, chemistry, biology, and engineering. Miniaturized devices can be electrical, such as microelectrodes and signal transducers; optical such as photodiodes and optical waveguides; and mechanical, such as pumps. In the new field of microfluidics, the integration of automated microflow devices and sensors allow very precise control of ultra-small flows on microchip platforms (Gravesen et al. (1993) *J. Micromech. Microeng.* 3:168-182; Shoji and Esashi (1994) *J. Micromech. Microeng.* 4:157-171). Many different flows can be combined in all sorts of ways and mixed on the same chip. Existing technology also allows the integration of intersecting channels, reaction chambers, mixers, filters, heaters, and detectors to perform on-chip reactions in sub-nanoliter volumes in a highly controlled and automated manner with integrated data collection and analysis (Colyer et al. (1997) *Electrophoresis* 18:1733-1741; Effenhauser et al. (1997) *Electrophoresis* 12:2203-2213).

In some embodiments, the parylene membrane filters can be integrated as part of a "microdevice" for filtering a sample. The term "microdevice" is used to describe miniaturized sensing devices and systems that integrate microscopic versions of the devices necessary to process chemical or biochemical samples, thereby achieving completely automated and computer controlled analysis on a microscale (typically handling 100 microliter sample volumes or less). Microdevices may be classified into two groups. One is a MEMS (Micro Electro Mechanical System), which uses pressurized flow controlled by mechanical flow control devices (e.g., microvalves, micropumps or centrifugal pumps). The other types use electrically driven liquid handling without mechanical elements. A variety of integrated these devices are well known to the art. See, for example, U.S. Pat. Nos. 6,043,080; 6,042,710; 6,042,709; 6,036,927; 6,037,955; 6,033,544; 6,033,546; 6,016,686; 6,012,902; 6,011,252; 6,010,608; 6,010,607; 6,008,893; 6,007,775; 6,007,690; 6,004,515; 6,001,231; 6,001,229; 5,992,820; 5,989,835; 5,989,402; 5,976,336; 5,972,710; 5,972,187; 5,971,355; 5,968,745; 5,965,237; 5,965,001; 5,964,997; 5,964,995; 5,962,081; 5,958,344; 5,958,202; 5,948,684; 5,942,443; 5,939,291; 5,933,233; 5,921,687; 5,900,130; 5,887,009; 5,876,187; 5,876,675; 5,863,502; 5,858,804; 5,846,708; 5,846,396; 5,843,767; 5,750,015; 5,770,370; 5,744,366; 5,716,852; 5,705,018; 5,653,939; 5,644,395; 5,605,662; 5,603,351; 5,585,069; 5,571,680; 5,410,030; 5,376,252; 5,338,427; 5,325,170; 5,296,114; 5,274,240; 5,250,263; 5,180,480; 5,141,621; 5,132,012; 5,126,022; 5,122,248; 5,112,460; 5,110,431; 5,096,554; 5,092,973; 5,073,239; 4,909,919; 4,908,112; 4,680,201; 4,675,300; and 4,390,403, all of which are incorporated by reference herein.

In a third aspect, the invention is drawn to methods of using the parylene membrane filters according to the invention to isolate particles or cells. In this aspect, the invention provides a method for isolating a particle or cell by obtaining a sample containing the particle or cell and passing the sample through a parylene membrane filter. The size and shape of the holes can be determined empirically, for example, by determining the ability of the holes to control the passage through the membrane of the particle or cell or of particles or cells of similar size and shape to the cell to be isolated.

In some embodiments, the sample is passed through a succession of membrane filters wherein each membrane filter comprises a parylene membrane having a plurality of holes wherein the holes of each succeeding parylene membrane are of smaller cross-sectional area than those of the parylene membrane of the preceding membrane filter, and the cell or particle is retained on one of the succession of membrane filters. In some embodiments, after the sample passes through the first membrane filter the cell or particle is retained on the upstream surface of a successive membrane filter. Two, three, four, five or more such membranes may be arranged in succession. In some embodiments, a successive membrane filter comprises a parylene membrane having a plurality of holes of a predetermined geometric design which differs from that of preceding membrane with regard to shape, density, arrangement, or opening area ratio.

For instance, the sample can be passed through a second membrane filter, wherein the second membrane filter comprises a second parylene membrane having a second plurality of holes of a second predetermined geometric design, wherein each of the plurality of holes of the second parylene membrane have a cross-sectional area which is smaller than the cross-sectional area of each of the holes of the first parylene membrane, and the cell or particle passes through the first membrane filter and is retained on the surface of the second membrane filter.

In some embodiments, a cell is to be isolated. In these embodiments, a sample is obtained which contains the cell and the sample is passed through a membrane filter which retains the cell but allows other components of the sample to pass through. For instance, the membrane filter may comprise a parylene substrate having a first plurality of holes of a predetermined geometric design which prevent the cell from passing through the membrane while allowing other smaller particles or soluble components to pass through. For instance, the cell may be of a size and shape which is too large to pass through the holes. The cell may be retained by the membrane filter when it has a minimum cross-sectional area greater which is greater than a maximal cross-sectional are of the predetermined geometric design. In some embodiments, the smallest achievable cross section of a deformable cell may be larger than the largest cross-section of each of the holes of the first predetermined design.

In other embodiments, where a cell is to be isolated, a sample containing the cell is obtained and passed through a membrane filter according to the invention which retains other components of the sample, but not the cell. For instance, the membrane filter may comprise a parylene substrate having a first plurality of holes of a predetermined geometric design which allow the cell to passing through the holes. For instance, the cell may be of a size and shape which is small enough to pass through the holes or too small to be retained by the membrane filter. The cell may pass through the membrane when it has a minimum cross-sectional area greater which is smaller than a maximal cross-sectional are of the predetermined geometric design.

In some embodiments, the sample can contain a cell of a first type and a cell of a second type and the predetermined geometric design selectively allows the cells of the second type to pass through the membrane filter while selectively limiting the passage of the cells of the first type.

The sample can be a body fluid or any fluid containing a cell. The sample can, for instance, urine, cerebrospinal fluid, saliva, peritoneal fluid, cardiac fluid, pericardial fluid, pleural fluid, blood, or plasma, semen, fluid from a wound or infection, bodily discharge, or mucous. The sample can be a disaggregated portion of a tissue, including disaggregated portions of a solid tumor. The cell to be isolated can be of any cell type, including, but not limited to, bacteria, yeast, eukaryotes, prokaryotes, and mammalian cells. In a preferred embodiment, the cell is tumor cell found in a body fluid. For instance, the cell can be a circulating tumor cell found in blood. The circulating tumor cell may further be from a solid tumor or of a solid-tumor cell type.

In some embodiments, the sample is from a mammal (e.g., primates, humans, mice, rats, rabbits). In further such embodiments, the cell can be a cancer cell, fetal cell, stem cell (e.g., cardiac stem cell, liver stem cell, neuronal stem cell, hematopoietic stem cells, endothelial stem cell). In some such embodiments, the sample is blood or a blood product bone marrow (e.g., aspirated, disaggregated bone marrow) or cord blood.

The mammalian cell can be of any cell, tissue type, or organ. It can be an epithelial cell, endothelial cell, nerve, immune system, a transformed cell, or a cell from the lung, liver, blood, liver, kidney, muscle, heart, brain, prostate, breast, bladder, esophagus, stomach, colon, mucosa, gastrointestinal tract. The cell can be a red blood cell, white blood cell, monocyte, dendritic cell, T-cell, B-cell. In some embodiments, the cell is a tumor cell or a circulating tumor cell of any tissue of origin, including those described above. The cell can be a leukemic cell or a lymphoma or a cancer cell.

"Cancer" refers to human cancers and carcinomas, sarcomas, adenocarcinomas, lymphomas, leukemias, and the like, including solid tumors and lymphoid cancers, kidney, breast, lung, kidney, bladder, colon, ovarian, prostate, pancreas, stomach, brain, head and neck, skin, uterine, testicular, esophagus, and liver cancer, lymphoma, including non-Hodgkins and Hodgkins lymphoma, leukemia, and multiple myeloma. "Urogenital cancer" refers to human cancers of urinary tract and genital tissues, including but not limited to kidney, bladder, urinary tract, urethra, prostate, penis, testicle, vulva, vagina, cervical and ovary tissues.

In some samples, the cell is a bacteria. In some further embodiments of such, the sample is urine, blood, saliva, saliva, a mucosal fluid, cerebrospinal fluid, an exudate from a would or infection, or a bodily fluid.

The sample can be fresh or salt water and the cell a single or multicelled organism (e.g., plankton, bacteria, fungi, protozoa, algae, amoeba, paramecium, protists). In some such embodiments, the invention provides a method of removing harmful organisms from drinking water.

A "sample" is a medium containing a substance of interest, synthetic or natural, to be examined, treated, determined or otherwise processed to determine the amount or effect of a known or unknown analyte therein. The sample to be filtered can be a "biological sample." A biological sample includes sections of tissues such as biopsy and autopsy samples which are disaggregated prior to filtration and suspension in a fluid medium. Such samples include blood and blood fractions or products (e.g., serum, plasma, platelets, red blood cells, and the like), sputum, tissue, cultured cells, e.g., primary cultures, explants, and transformed cells, stool, urine, etc. A biological sample is typically obtained from a eukaryotic organism, most preferably a mammal such as a primate e.g., chimpanzee or human; cow; dog; cat; a rodent, e.g., guinea pig, rat, Mouse; rabbit; or a bird; reptile; or fish.

A sample may be filtered directly, if liquid, or suspended or diluted in a suitable liquid medium. Preferred medium for cells are physiologically compatible aqueous fluids and buffers (e.g., phosphobuffered saline, growth medium if a viable cell is to be isolated) which are free of extraneous particles. Preferred medium for particles are those which are free of extraneous particles and do not dissolve the particle of interest and which are compatible with the parylene membrane filter. A particularly preferred medium for most water-insoluble particles is aqueous. The medium may include components which enable detection of the particle or cell or reduce viscosity.

A "biopsy" refers to the process of removing a tissue sample for diagnostic or prognostic evaluation, and to the tissue specimen itself. Any biopsy technique known in the art can be applied to the diagnostic and prognostic methods of the present invention. The biopsy technique applied will depend on the tissue type to be evaluated (i.e., prostate, lymph node, liver, bone marrow, blood cell), the size and type of the tumor (i.e., solid or suspended (i.e., blood or ascites)), among other factors. Representative biopsy techniques include excisional biopsy, incisional biopsy, needle biopsy, surgical biopsy, and bone marrow biopsy. An "excisional biopsy" refers to the removal of an entire tumor mass with a small margin of normal tissue surrounding it. An "incisional biopsy" refers to the removal of a wedge of tissue that includes a cross-sectional diameter of the tumor. A diagnosis or prognosis made by endoscopy or fluoroscopy can require a "core-needle biopsy" of the tumor mass, or a "fine-needle aspiration biopsy" which generally obtains a suspension of cells from within the tumor mass. Biopsy techniques are discussed, for example, in *Harrison's Principles of Internal Medicine*, Kasper, et al., eds., 16th ed., 2005, Chapter 70, and throughout Part V. The samples may be enzymatically disaggregated prior to filtration as known to one of ordinary skill in the art.

"Antibody" refers to a polypeptide comprising a framework region from an immunoglobulin gene or fragments thereof that specifically binds and recognizes an antigen. The recognized immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively. Typically, the antigen-binding region of an antibody will be most critical in specificity and affinity of binding.

An exemplary immunoglobulin (antibody) structural unit comprises a tetramer. Each tetramer is composed of two identical pairs of polypeptide chains, each pair having one "light" (about 25 kD) and one "heavy" chain (about 50-70 kD). The N-terminus of each chain defines a variable region of about 100 to 110 or more amino acids primarily responsible for antigen recognition. The terms variable light chain ($V_L$) and variable heavy chain ($V_H$) refer to these light and heavy chains respectively.

Antibodies exist, e.g., as intact immunoglobulins or as a number of well-characterized fragments produced by digestion with various peptidases. Thus, for example, pepsin digests an antibody below the disulfide linkages in the hinge region to produce F(ab)'$_2$, a dimer of Fab which itself is a light chain joined to $V_H$-$C_H$1 by a disulfide bond. The F(ab)'$_2$ may be reduced under mild conditions to break the disulfide linkage in the hinge region, thereby converting the F(ab)'$_2$ dimer into an Fab' monomer. The Fab' monomer is essentially Fab with part of the hinge region (see *Fundamental Immunology* (Paul ed., 3d ed. 1993). While various antibody fragments are defined in terms of the digestion of an intact antibody, one of skill will appreciate that such fragments may be synthesized de novo either chemically or by using recombinant DNA methodology. Thus, the term antibody, as used herein, also includes antibody fragments either produced by the modification of whole antibodies, or those synthesized de novo using recombinant DNA methodologies (e.g., single chain Fv) or those identified using phage display libraries (see, e.g., McCafferty et al., *Nature* 348:552-554 (1990))

For preparation of antibodies, e.g., recombinant, monoclonal, or polyclonal antibodies, many techniques known in the art can be used (see, e.g., Kohler & Milstein, *Nature* 256:495-497 (1975); Kozbor et al., *Immunology Today* 4: 72 (1983); Cole et al., pp. 77-96 in *Monoclonal Antibodies and Cancer Therapy*, Alan R. Liss, Inc. (1985); Coligan, *Current Protocols in Immunology* (1991); Harlow & Lane, *Antibodies, A Laboratory Manual* (1988); and Goding, *Monoclonal Antibodies: Principles and Practice* (2d ed. 1986)). The genes encoding the heavy and light chains of an antibody of interest can be cloned from a cell, e.g., the genes encoding a monoclonal antibody can be cloned from a hybridoma and used to produce a recombinant monoclonal antibody. Gene libraries encoding heavy and light chains of monoclonal antibodies can also be made from hybridoma or plasma cells. Random combinations of the heavy and light chain gene products generate a large pool of antibodies with different antigenic specificity (see, e.g., Kuby, *Immunology* (3$^{rd}$ ed. 1997)). Techniques for the production of single chain antibodies or recombinant antibodies (U.S. Pat. No. 4,946,778, U.S. Pat. No. 4,816,567) can be adapted to produce antibodies to polypeptides of this invention. Also, transgenic mice, or other organisms such as other mammals, may be used to express humanized or human antibodies (see, e.g., U.S. Pat. Nos. 5,545,807; 5,545,806; 5,569,825; 5,625,126; 5,633,425; 5,661,016, Marks et al., *Bio/Technology* 10:779-783 (1992); Lonberg et al., *Nature* 368:856-859 (1994); Morrison, *Nature* 368:812-13 (1994); Fishwild et al., *Nature Biotechnology* 14:845-51 (1996); Neuberger, *Nature Biotechnology* 14:826 (1996); and Lonberg & Huszar, *Intern. Rev. Immunol.* 13:65-93 (1995)). Alternatively, phage display technology can be used to identify antibodies and heteromeric Fab fragments that specifically bind to selected antigens (see, e.g., McCafferty et al., *Nature* 348:552-554 (1990); Marks et al., *Biotechnology* 10:779-783 (1992)). Antibodies can also be made bispecific, i.e., able to recognize two different antigens (see, e.g., WO 93/08829, Traunecker et al., *EMBO J.* 10:3655-3659 (1991); and Suresh et al., *Methods in Enzymology* 121: 210 (1986)). Antibodies can also be heteroconjugates, e.g., two covalently joined antibodies, or immunotoxins (see, e.g., U.S. Pat. No. 4,676,980, WO 91/00360; WO 92/200373; and EP 03089).

In some embodiments, the cell to be captured is first modified to change its effective size. In one embodiment, the cell is modified by covalently or non-covalently attaching the cell to a particle of a size which is excluded from passage through a parylene membrane filter. In this fashion, the cell to be captured can be isolated from cells or particles of otherwise a similar or smaller size than the cell of interest as these other cells will pass through a filter when a sample with the cell to be captured is passed through a parylene membrane filter. For instance, the cell can be contacted with an antibody or antibody fragment or another binding agent (e.g., ligand for a cell surface receptor on the cell to be captured), which is selective or specific with respect to the cell to be captured and which is covalently or non-covalently attached to the particle. In some embodiments, the particle may be a polymeric, ceramic, glass, or metal and may be in the form of a bead or have an irregular shape. In some embodiments, the attachment may be fashioned to be readily severed by a subsequent treatment (e.g., enzymatic, chemical, or photolytic cleavage of suitably labile linkers; addition of competitive binding ligands which disrupt the attachment, etc.). In such embodiments, upon cleavage of the attachment, the captured cell is then able to pass through the parylene membrane filter isolated from particles of a similar size which passed through the filter.

Many coupling agents are known in the art and can be used to immobilize the antibodies and ligands and labels in the methods of the present invention. Coupling agents are exemplified by bifunctional crosslinking reagents, i.e., those which contain two reactive groups which may be separated or tethered by a spacer. These reactive ends can be of any of a number of functionalities including, without limitation, amino reactive ends such as N-hydroxysuccinamide, active esters, imidoesters, aldehydes, epoxides, sulfonyl halides, isocyanate, isothiocyanate, nitroaryl halides, and thiol reactive ends such as pyridyl disulfide, maleimides, thiophthalimides and active halogens.

As described in U.S. Pat. No. 4,824,529, hydroxyl functional groups are commonly introduced to the surfaces of glasses, semiconductors, metal oxides, metals and polymers. These hydroxyl groups react with commercially available linkers such as (3-aminopropyl) triethyloxysilane or with thiol-terminal silanes, for example. To these amino or thiol-terminal silanes one may then graft the desired peptide, protein, lipidic, or glycosidic moiety via homobifunctional crosslinkers such as gluteraldehyde or via heterobifunctional crosslinkers.

Proteins and nucleic acids have been immobilized onto solid supports in many ways. Methods used for immobilizing such are described in the following references, and others (Mosbach (1976) Meth. Enzymol. 44:2015-2030; Weetall (1975) Immobilized Enzymes, Antigens, Antibodies and Peptides; Hermanson, G. T. (1996) Bioconjugate Techniques (Academic Press, NY); Bickerstaff, G. (ed) (1997). Immobilization of Enzymes and Cells (Humana Press, NJ); Cass and Ligler (eds) Immobilized Biomolecules in Analysis, (Oxford University Press); Watson et al. (1990) Curr. Opin. Biotech. 609:614; Ekins, R. P. (1998) Clin. Chem. 44:2105-2030; Roda et al. (2000) Biotechniques 28:492-496; Schena et al. (1998) Trends in Biotechnol. 16:301-306; Ramsay, G. (1998) Nat. Biotechnol. 16:40-44; Sabanayagam et al. (2000) Nucl. Acids Res. 28:E33; U.S. Pat. No. 5,700,637 (Southern, 1997); U.S. Pat. No. 5,736,330 (Fulton, 1998); U.S. Pat. No. 5,770,151 (Roach and Jonston, 1998); U.S. Pat. No. 5,474, 796 (Brenman, 1995); U.S. Pat. No. 5,667,667 (Southern, 1997); all of which are incorporated by reference herein).

A great many cross-linkers are commercially available (e.g., from Pierce Chemical Company (Rockford, Ill.). A cross-linker is a molecule which has two reactive groups with which to covalently attach a protein, nucleic acids or other molecules. In between the reactive groups is typically a spacer group. Steric interference with the activity of the biomolecule by the surface may be ameliorated by altering the spacer composition or length. There are two groups of cross-linkers, homobifunctional and heterobifunctional. In the case of heterobifunctional crosslinkers, the reactive groups have dissimilar functionalities of different specificities. On the other hand, homobifunctional cross linkers' reactive groups are the same. A through review of crosslinking can be found in Wong, 1993, Chemistry of Protein Conjugation and Crosslinking, CRC Press, Boca Raton. Bifunctional cross-linking reagents may be classified on the basis of the following (Pierce Chemical Co. 1994): functional groups and chemical specificity, length of cross-bridge, whether the cross-linking functional groups are similar (homobifunctional) or different (heterobifunctional), whether the functional groups react chemically or photochemically, whether the reagent is cleavable, and whether the reagent can be radiolabeled or tagged with another label.

The term "label" is used herein to refer to agents or moieties that are capable of providing a detectable signal, either directly or through interaction with additional members of a signal producing system. Labels that are directly detectable and may be used in the subject invention include, for example, fluorescent labels where fluorescers of interest include, but are not limited to fluorescein (FITC, DTAF) (excitation maxima, 492 nm/emission maxima, 516-525 nm); Texas Red (excitation maxima, 595/emission maxima, 615-620); Cy-5 (excitation maxima, 649/emission maxima, 670); RBITC (rhodamine-B isothiocyanate (excitation maxima, 545-560 nm/emission maxima, 585 nm) and others as reviewed, for example, in Haugland, R. P. (1992) Handbook of Fluorescent Probes and Research Chemicals, 5th ed., Molecular Porbes, Eugene, Oreg.; radioactive isotopes, such as $^{32}S$, $^{32}P$, $^{3}H$, and the like. Other labels can include chemiluminescent compounds, enzymes and substrates; chromogens, metals, nanoparticles, liposomes or other vesicles containing detectable substances. Colloidal metals and dye particles suitable for labels are disclosed in U.S. Pat. Nos. 4,313,734 and 4,373, 932. Chemiluminescent and fluorescent labels allowing ultrasensitive assays are preferred. Labels may be detected by spectrophotometric, radiochemical, electrochemical, chemiluminescent and other means. Labels may be covalently conjugated to binding pair members.

Labels may be conjugated directly to the biorecognition molecules, or to probes that bind these molecules, using conventional methods that are well known in the arts (see above). Multiple labeling schemes are known in the art and permit a plurality of binding assays to be performed simultaneously in the same reaction vesicle. Different labels may be radioactive, enzymatic, chemiluminescent, fluorescent, or others. Multiple distinguishable labels may be attached directly to biomolecules or they may be attached to surfaces onto which the biomolecules are immobilized. For example, beads or other particles may bear different labels, e.g., a combination of different fluorescent color dyes, that allow each bead to be independently identified. For example, Fulton et al, 1997, *Clin. Chem.* 43: 1749-1756, describe a standard set of 64 microspheres where each different type of microsphere is tagged with a unique combination of fluorescent dyes. Different biomolecules are immobilized to each microsphere type and reacted with their binders which are labeled with a different color fluorescent dye. The detector simultaneously identifies each bead type and the captured ligand based on the fluorescent profiles generated by the different colored fluorescent dyes.

Preferred detectable labels include enzymatic moieties capable of converting a substrate into a detectable product. Enzymes are amplifying labels (one label leads to many signals) and facilitate the development of ultrasensitive assays. For example, alkaline phosphatase and horseradish peroxidase are commonly used enzyme labels and attomole-zeptomole detection limits are routinely achieved in chemiluminescent assays with these enzymes. For alkaline phosphatase, the adamantly 1,2-dioxetane acrylphosphate substrates provide ultrasensitive assays (Bronstein et al. (1989) J. Biolumin. Chemilumin. 4:99-111). And for horseradish peroxidase, the 4-iodophenol-enhanced luminol reaction is among the most sensitive (Thorpe, et al, (1986) Methods Enzymol. 133:331-353). In such embodiments where an enzymatic label is used to convert a substrate into a detectable produce, the appropriate substrate is also added preferably after the binders have been captured on the surface.

Fluorescent labels are particularly useful in some embodiments of the current invention. By the use of optical techniques (e.g., confocal scanners, CCD cameras, flow cytometers), they permit the analysis of arrays of biorecognition elements distributed over a surface (e.g., as microdots where each microdot binds a different analyte) or differentially labeled (e.g., with beads having different combinations of fluorescent dyes).

Furthermore, biotinylated binders may also be labeled in a second step using avidin or streptavidin (which bind biotin) conjugated to a fluorophor or some other label. This labeling method is commonly used in the art.

In any of the above embodiments, the isolated cell may be further used or manipulated. For instance, the isolated cells may be detected, counted, cultured, characterized, concentrated, or obtained for further use (administration in a cell-based therapy). The isolated cell may be detected, counted, cultured, characterized, on the parylene membrane filter. With regard to detection and characterization, the cells may be detected and/or characterized by contacting the cell with a histological stain or contacting the retained cell with a tissue-specific or cell-type specific antibody having a label. The antibody may be a monoclonal antibody. The cell may be contacted with a reagent capable of detecting expression of a protein (e.g., a tumor associated antigen) or a nucleic acid encoding the protein (e.g., nucleic acid encoding a tumor associated antigen). In some embodiments, the cells are characterized as to their ability to become invasive or metastasize. In some embodiments, the cells are characterized for sensitivity or responsiveness to a therapeutic agent. In some embodiments, the cells are cultured for further study or autologous or heterologous transplant.

In further embodiments of the above, the invention provides methods for monitoring the health status of a patient having a disease caused by a harmful cell by obtaining a sample of a body fluid containing the harmful cell and isolating the harmful cell by passing the sample through a membrane filter having a parylene substrate having a plurality of holes of a predetermined geometric design; and detecting the isolated harmful cell. The harmful cell can be, for instance, a cancer cell or a bacterium or an immune system cell. In some further embodiments, the number of the detected cells is counted.

In some embodiments, the isolated cell is characterized by the number isolated or concentration in the sample and/or phenotype to determine the likelihood of metastasis or the presences of a malignant tumor. In some such embodiments, the sample of the body fluid is blood, or urine. Methods of characterizing the phenotype of cells with respect to their potential for metastasis are well known in the art.

In some embodiments of the above, the invention provides methods for monitoring the health status of a patient having a disease caused by a deficiency of a beneficial cell by obtaining a sample of a body fluid containing the beneficial cell and isolating the beneficial cell by passing the sample through a membrane filter having a parylene substrate having a plurality of holes of a predetermined geometric design; and detecting the isolated beneficial cell. The beneficial cell can be, for instance, an immune system cell or a stem cell. In some further embodiments, the number of the detected cells is counted.

In another set of embodiments, the invention provides methods for evaluating the therapeutic efficacy of a treatment for a condition caused by a harmful cell, the method comprising by obtaining a sample of a body fluid containing the harmful cell during or after the treatment; and isolating the harmful cell by passing the sample through a membrane filter having a parylene substrate fluid having a plurality of holes of a predetermined geometric design; and detecting the retained harmful cell in the sample. In further embodiments, a sample of the body fluid containing the harmful cell may also be obtained before the treatment to provide a pretreatment sample; and the harmful cell can be isolated by passing the pretreatment sample through a membrane filter having a parylene substrate having a plurality of holes of a predetermined geometric design; and the isolated harmful cell in the pretreatment sample can be compared to the isolated harmful cell in the sample obtained during or after the treatment. The cells may be compared as to number, viability, or phenotype. The harmful cell may be a cancer or a cell of the immune system. In some further embodiments, the treatment is selected from the group consisting of immunotherapy, chemotherapy, radiation therapy, excision of a tumor, induction of apoptosis, or any combination thereof. In some embodiments, the therapy is an antibiotic therapy and the harmful cell is a bacteria.

In some embodiments, an insoluble particle isolated from a sample. The sample may be obtained from a living organism or from the environment (air, water, soil) or an article of human manufacture. The particle may be asbestos, uric acid, crystal, or amorphous solid. The isolated particle may then be counted or characterized.

In some embodiments, invention provides a method of removing particulate contaminants from a fluid by passing the sample through a membrane filter comprising a parylene substrate according to the invention. The fluid may be a culture medium, or a drinking water, a medicinal or substance for administration to a human by any route of administration (e.g., oral, intravenous, inhalation).

As used herein, the term "parylene" with reference to a "parylene" membrane filter refers to a polymer having formulae I, II, and III (see below) or combinations thereof. The polymer can be a homopolymer, a copolymer, a polymer blend or combinations thereof $R^1$, $R^2$, $R^7$ and $R^8$ are each independently H, alkyl, heteroalkyl, aryl or halogen. The alkyl can be a $C_1$-$C_6$ hydrocarbon radical. The halogen is Cl, F, Br, or I. Heteroalkyl is an alkyl substituent containing at least one heteroatom, such as O, S, N, Si or P.

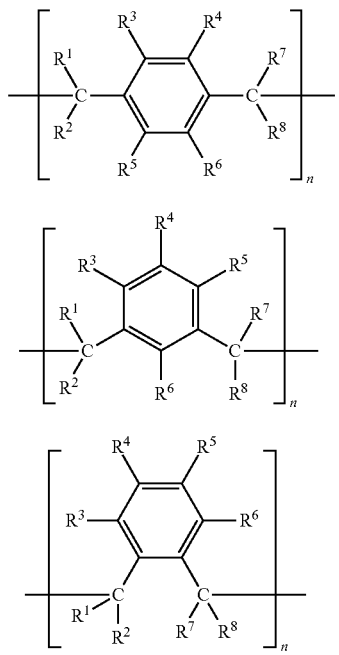

$R^3$-$R^6$ are each independently H, alkyl, aryl, halogen, heteroalkyl, hydroxyl, amino, alkylamino, arylamino, aroylamino, carbamoylamino, aryloxy, acyl, thio, alkylthio, cyano, alkoxy. An alkyl group can be a substituted alkyl having up to 29 carbon atoms. A substituted alkyl can be mono- or polyunsaturated alkenyl or alkynyl radical having in each case up to 29 carbon atoms, i.e., a substituted $C_1$-$C_{29}$alkyl, $C_2$-$C_{29}$alkenyl or $C_2$-$C_{29}$alkynyl radical. Suitable substitutents are also cyclic radicals. The substituted alkyls can be methyl, ethyl, or propyl radical, carrying one or more identical or different radicals. Depending on the nature of the substitutents, these can be attached via a single or multiple bond or in a spiro form. Preferred substituents are halogen, such as Cl, F, Br or I, amino, lower alkylamino, lower alkanoylamino, aroylamino, such as, in particular, benzoyl amino, hyroxyamino, hydroxyimino, lower alkoxyamino, aroxyamino, such as, in particular, phenoxyamino. Lower alkylthio includes $C_1$-$C_6$alkylthiols. Aryloxycarbonyl includes phenoxycarbonyl, benzyloxycarbonyl, hydroxyaminocarbonyl, aminoacylamino, carbamoyl, amidino. Aryoxy can be phenyloxy, aminocarbonyl-oxy, oxo, aminosulfonyl and lower alkylsulfonyl-amino. Heteroalkyl is an alkyl substitutent having one or more heteroatoms in the alkyl substitutents, in particular, mercaptoalkyl having up to 29 carbon atoms, aminoalkyl, phosphinoalkyl, haloalkyl, hydroxyalkyl or silylalkyl. Preferably, parylene has a structure represented by the formula I. In preferred embodiments of the above $R^1$, $R^2$, $R^7$, and $R^8$ are independently hydrogen or $C_1$-$C_6$ alkyl. In other embodiments of the above $R^3$ to $R^6$ are independently hydrogen or $C_1$-$C_6$ alkyl. In other embodiments of the above, $R^1$, $R^2$, $R^7$, and $R^8$ are independently hydrogen or $C_1$-$C_6$ alkyl and at least one or one of $R^3$ to $R^6$ comprises or is a functional group (e.g., amino, thio, hydroxy, halo). In some further embodiments, the halo group is chloro or fluoro. In some embodiments of any of the above, the $R^1$ to $R^8$ members are not themselves substituted.

Functionalized parylene polymers are also contemplated. Funtionalized parylene includes a parylene having formula (I), wherein at least one of the $R^3$ to $R^6$ members is a functional group. Suitable functional groups include, but are not limited to, optionally substituted amino, hydroxyl, hydroxyamino, heteroalkyl, heteroaryl, mercapto, formyl, alkanoyl, carboxylate, alkoxycarbonyl, alkoxycarbonyloxy, hydroxycarbonyl, halide, cyano, amide, carbamoyl, thiocarbamoyl, ureido and thioureido. Heteroalkyl refers to alkyl groups (or rings) that contain at least one heteroatom selected from N, O, and S, wherein the nitrogen and sulfur atoms are optionally oxidized, and the nitrogen atom(s) are optionally quaternized. A heteroatom can form a double bond with a carbon atom. A heteroalkyl group can be attached to the remainder of the molecule through a/the heteroatom. Heteroaryl refers to aryl groups that contain from one to five heteroatoms selected from N, O, and S, wherein the nitrogen and sulfur atoms are optionally oxidized, and the nitrogen atom(s) are optionally quaternized. In preferred embodiments of the above, $R^1$, $R^2$, $R^7$, and $R^8$ are each hydrogen or $C_1$-$C_3$ alkyl. In some embodiments, only one of the $R^3$ to $R^6$ members is a functional group.

A functionalized parylene membrane may be covalently modified via the functional group thereof to facilitate the detection or retention of the cell or particle to be captured. In some embodiments, the functionalized parylene membrane filter is further modified by having an antibody or antibody fragment covalently or non-covalently bound thereto. In some embodiments, the antibody or fragment may specifically recognize the cell to be isolated. In other embodiments, the surface of the functionalized parylene membrane filter is covalently or non-covalently attached to a ligand capable of binding a receptor on the surface of a cell to be retained by the filter. The conjugation chemistry described above can be used in attaching ligands or antibodies to the functionalized parylene membrane filter.

Preferred types of parylene include commercially available parylene C, F, A, AM, N, and D. Of the three most common types of parylene shown below, parylene C is perhaps the most widely used in industry. Further advantages of the parylene membrane substrate include strength and flexibility (e.g., Young's modulus≈4 GPa), conformal pinhole-free room-temperature deposition, low dielectric constant (≈3) high volume resistivity (>$10^{16}$ Ω-cm), transparency, and ease of manipulation using standard microfabrication techniques such as reactive ion etching (RIE).

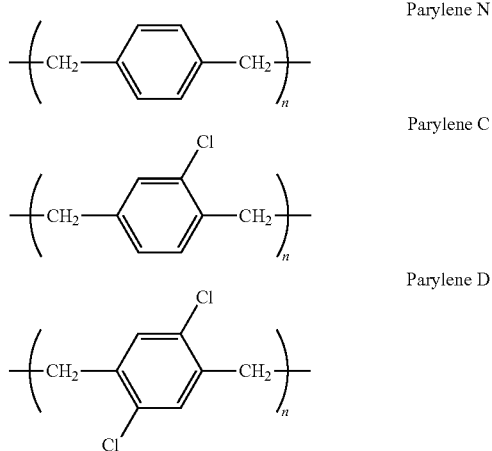

Parylene N

Parylene C

Parylene D

In other embodiments, the invention provides parylene membrane filtration devices which comprise the parylene membrane filter and a housing. Advantageously, the parylene membrane filter allows the filtration of many fluids, including, biological fluids as described in detail below.

As used herein, the term "monodispersed" refers to openings or holes on the membrane filter having substantially identical size, dimension and shape.

FIG. 1 illustrates a fabricated parylene membrane filter according to the invention 100. As shown, the membrane filters having predetermined different geometric designs can be fabricated to achieve the desired results. A geometric design includes the plan of size, shape and density of the openings on the membranes. FIG. 1A shows a parylene membrane having 50 parylene membrane filters formed therein. A representative membrane filter 110 is shown. As set forth above a variety In one embodiment, square holes are monodispersed. In another embodiment, the holes are uniformly-spaced. FIG. 1B shows a portion of one of the membrane device having circular openings 125. In one embodiment, the circular holes are monodispersed. In another embodiment, the holes are uniformly-spaced. FIG. 1C shows a portion of one of the membrane device having oval holes 135. In one embodiment, the oval holes are monodispersed. In another embodiment, the holes are uniformly-spaced. The shape of the holes on the membrane includes, but is not limited to, a circle, an oval, a symmetric polygon, an unsymmetrical polygon, an irregular shape and combinations thereof. In some embodiments, the membrane filter has circular, rectangular, or hexagonal holes.

FIG. 1B illustrates a membrane having monodispersed and uniformly spaced 10 micron circular holes. FIG. 1C illustrates a membrane having monodispersed and uniformly-spaced 8 micron×14 micron oval holes. The hole size can be precisely controlled using reactive ion etching (RIE) technology (see, U.S. Pat. No. 6,598,750 incorporated herein by reference). Hole dimensions and opening factors can vary from 0.1 micron to 12 micron or greater and from 4 to 45%, respectively. Preferably, in some embodiments, the hole dimensions are from 5 micron to 12 micron. In some embodiments, the density of the holes can be precisely controlled up to 40,000 holes per square millimeter. The thickness of the parylene membrane can also be controlled. Generally, a thicker membrane is needed for a higher density of holes. Parylene membranes with various thicknesses from about 0.1 micron or 1 micron to 15 micron or more are contemplated. In one embodiment, a 10 micron thick parylene membrane is used.

In some embodiments, parylene membrane filters having uniformly-spaced holes are prepared. In other embodiments, parylene membrane filters having an array of monodispersed holes are prepared. The membranes with monodispersed and uniformly distributed holes have a higher cell capturing efficiency than membranes with randomly distributed and polydispersed holes.

Figure 2:
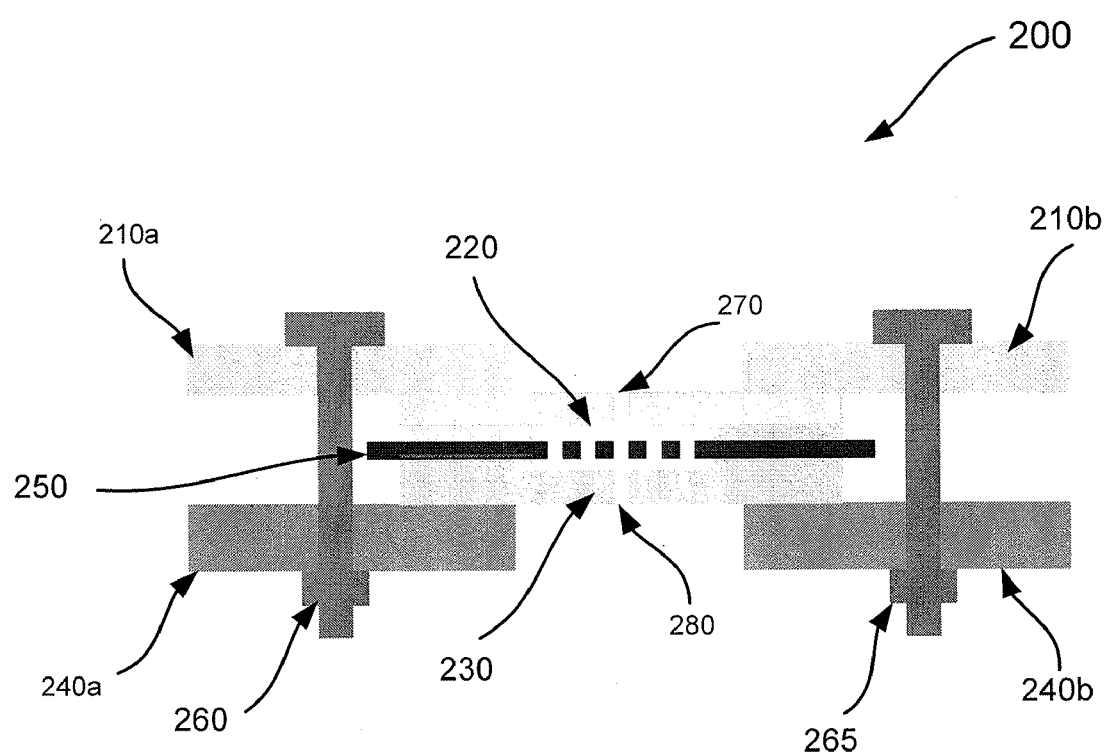
FIG. 2 illustrates a typical parylene membrane filter device assembly.

FIG. 2 illustrates one aspect of a parylene membrane filter device 200. The device includes a parylene membrane 250 mounted inside a housing. The housing can adopt a variety of sizes and shapes, which include, but is not limited to, tubular, spherical and cubical shapes. In one embodiment, the housing is made of a top chamber 220 having an insertion port 270 and a bottom chamber 230 having an exit port 280. Various materials can be used for the construction of the chambers. The materials include, but are not limited to, polysiloxane, polycarbonate, polyacrylate, polyethylene, polystyrene, polysaccharides and copolymers and combinations thereof. In one embodiment, the material used for construction of the chambers is polydimethylsiloxane (PDMS). In one embodiment, the top chamber, the bottom chamber and a parylene membrane are clamped by two pairs of jigs (210a, 210b; 240a, 240b). The top jig 210a and 210b can be made of polyacrylate, polyketone, polystyrene, polypropylene and the like. The bottom jig is made of an engineering material, which includes, but is not limited to, a polyketone, a polysulfone, a polysulfide or a polyimide. In one embodiment, the bottom jig is polyetheretherketone (PEEK). The jigs are held together by suitable means 260 and 265, such as bolts, fasteners, screws, latches, links, joints, locks or unions.

In some embodiments, the membrane filter is any membrane filter set forth in the detailed description of the specification of U.S. patent application Ser. No. _____: (yet to be assigned) filed this same date and entitled "MEMBRANE FILTER FOR CAPTURING CIRCULATING TUMOR CELLS" and having Ser. No. 11/408,501, which is particularly incorporated herein by reference in its entirety, with respect to such membrane filters and also the suitable membrane substrates thereof.

Various parylene and parylene-like materials can be used as substrates in the present invention when circulating tumor cells are to be detected. In this application, other materials, such as polyimide, polysiloxane, polyester, polyacrylate, cellulose, Teflon and polycarbonate may also be suitable filter substrates. In this application, the substrates used in the present invention are not limited to materials discussed above, but also include other materials, which perform substantially the same function as parylene, in substantially the same way as parylene and achieve substantially the same result as parylene. Preferably, these have a figure of merit of about 890 and/or having a Young's modulus≈4 GPa. Figure of merit provides a measure of the efficiency of the filtration device. A large figure of merit number is an indication of higher filtration efficiency. Figure of merit is defined as the recovery rate divided by time. Recovery rate is defined as particles recovered divided by the total number of target particles. The time used in the calculation of figure of merit is the total processing time to conduct the testing.

Figure 3:
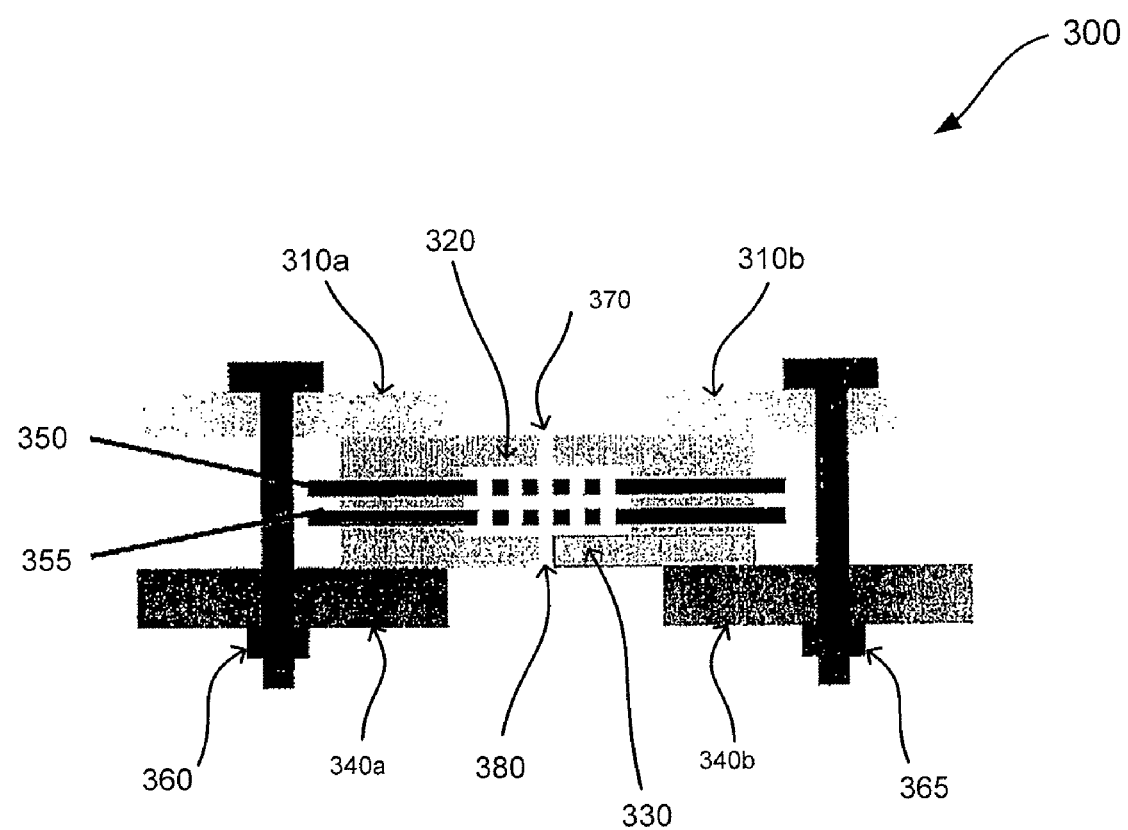
FIG. 3 illustrates the configuration of a filter device assembly with multiple parylene membranes.

In another embodiment, filters having multiple membranes with various geometric designs can be used for the separation of CTC cells and other cells and particles in the blood. Each successive membrane can have the same or different geometric designs. For example, the size, shape and density of the holes can be varied at each membrane layer. An active sandwich layer can be optionally placed in between any two membrane filters. Alternatively, the sandwich layer can be an inert layer. FIG. 3 illustrates an embodiment of a two-membrane filter device 300. The top filter 350 and the bottom filter 355 are parylene or parylene-like membranes. The top filter and the bottom filters can have the same or different geometric designs. In one embodiment, the top filter has circular holes and the bottom filter has oval holes. In another embodiment, the dimension of the holes on the top filter is approximately 10 micron and the dimension of the holes on the bottom filter is 8 by 14 micron. In a preferred embodiment, each membrane has an array of monodispersed holes. In another preferred embodiment, each membrane has an array of uniformly-spaced holes. The parylene membranes 355 and 355 are mounted inside a housing. The housing can adopt a variety of sizes and shapes, which include, but is not limited to, tubular, spherical and cubical shapes. In FIG. 3, the housing is made of a top chamber 320 having an insertion port 370 and a bottom chamber 330 having an exit port 380. Various materials can be used for the construction of the chambers. The materials include, but are not limited to, polysiloxane, polycarbonate, polyacrylate, polyethylene, polystyrene, polysaccharides and copolymers and combinations thereof. In one embodiment, the material used for construction of the chambers is polydimethylsiloxane (PDMS). In one embodiment, the top chamber, the bottom chamber and a parylene membrane are clamped by two pairs of jigs (310$a$, 310$b$; 340$a$, 340$b$). The top jig 310$a$ and 310$b$ can be made of polyacrylate, polyketone, polystyrene, polypropylene and the like. The bottom jig is made of an engineering material, which includes, but is not limited to, a polyketone, a polysulfone, a polysulfide or a polyimide. In one embodiment, the bottom jig is polyetheretherketone (PEEK). The jigs are held together by suitable means 360 and 365, such as bolts, fasteners, screws, latches, links, joints, locks or unions.

In yet another embodiment, the present invention provides a membrane filter device having a plurality of membrane filters assembled inside a housing for the separation of fine particles, such as, bacteria or viruses. Each of the upper membranes has a different geometric design from each of the adjacent lower membranes. The geometric design varies in the hole size, shape and density. The holes on each of the membranes are designed such that each successive layer only traps the desired cells or particles and allow undesired substance to pass through. For example, cells or bacteria passing through a first filter can be captured by the subsequent second or the third filter having a different geometric design.

In another aspect, the membrane substrate for use according to the invention can also be a polyimide. In another embodiment, at least one of the plurality of membrane filters comprises a parylene membrane filter.

Figure 4A:
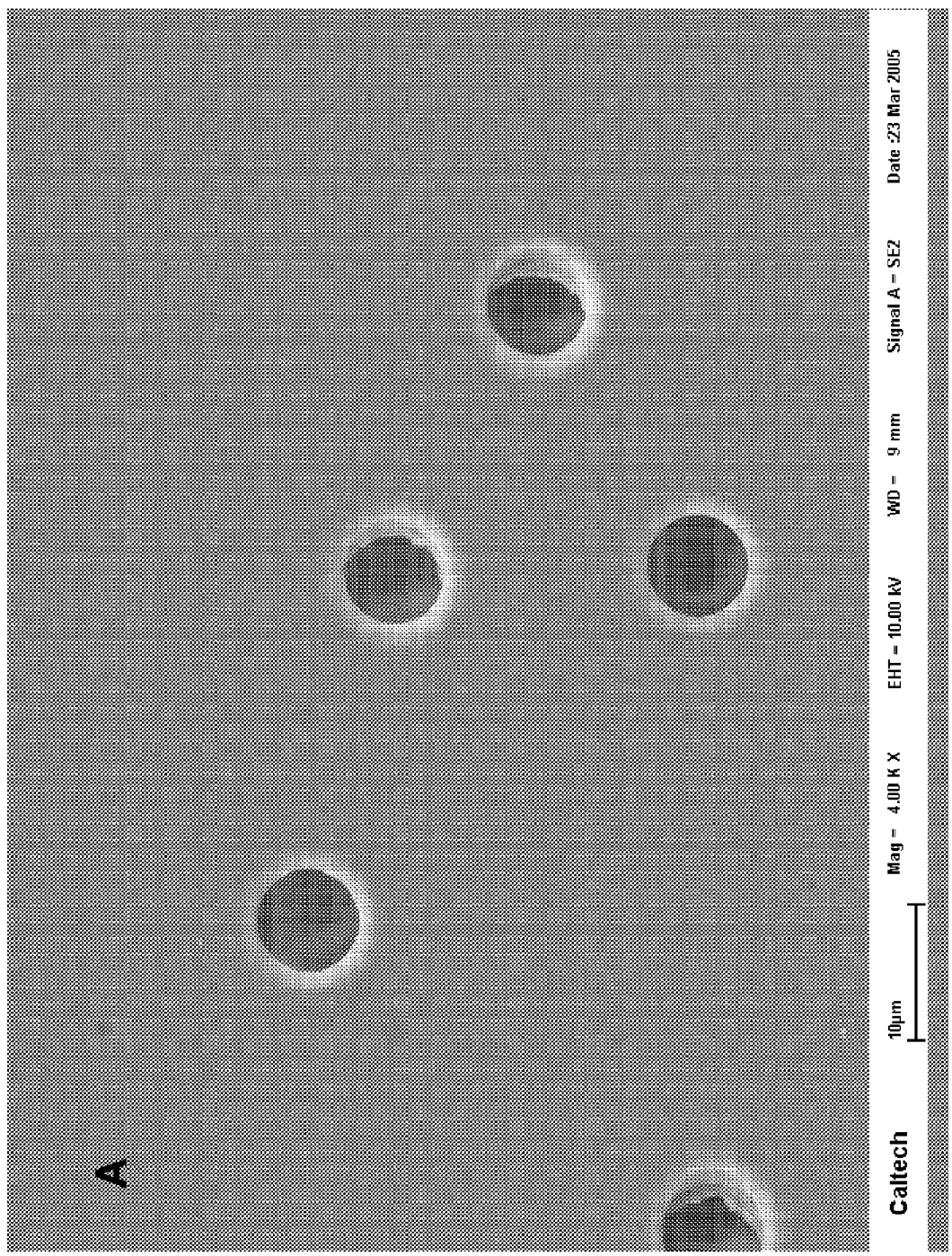
FIG. 4A shows an SEM image of a commercial membrane filter.
Figure 4B:
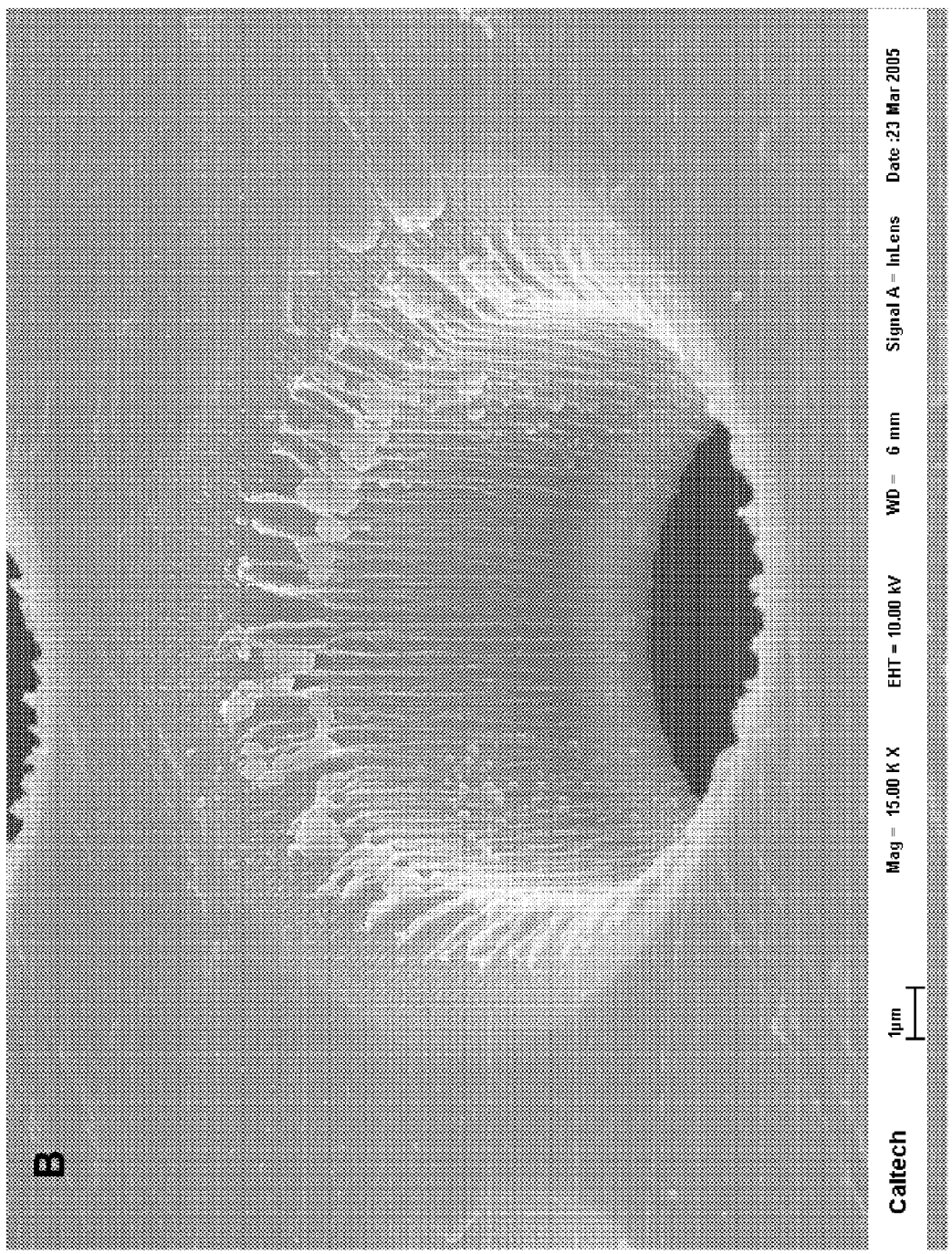
FIG. 4B shows the image of a microfabricated parylene membrane filter.
Figure 4C:
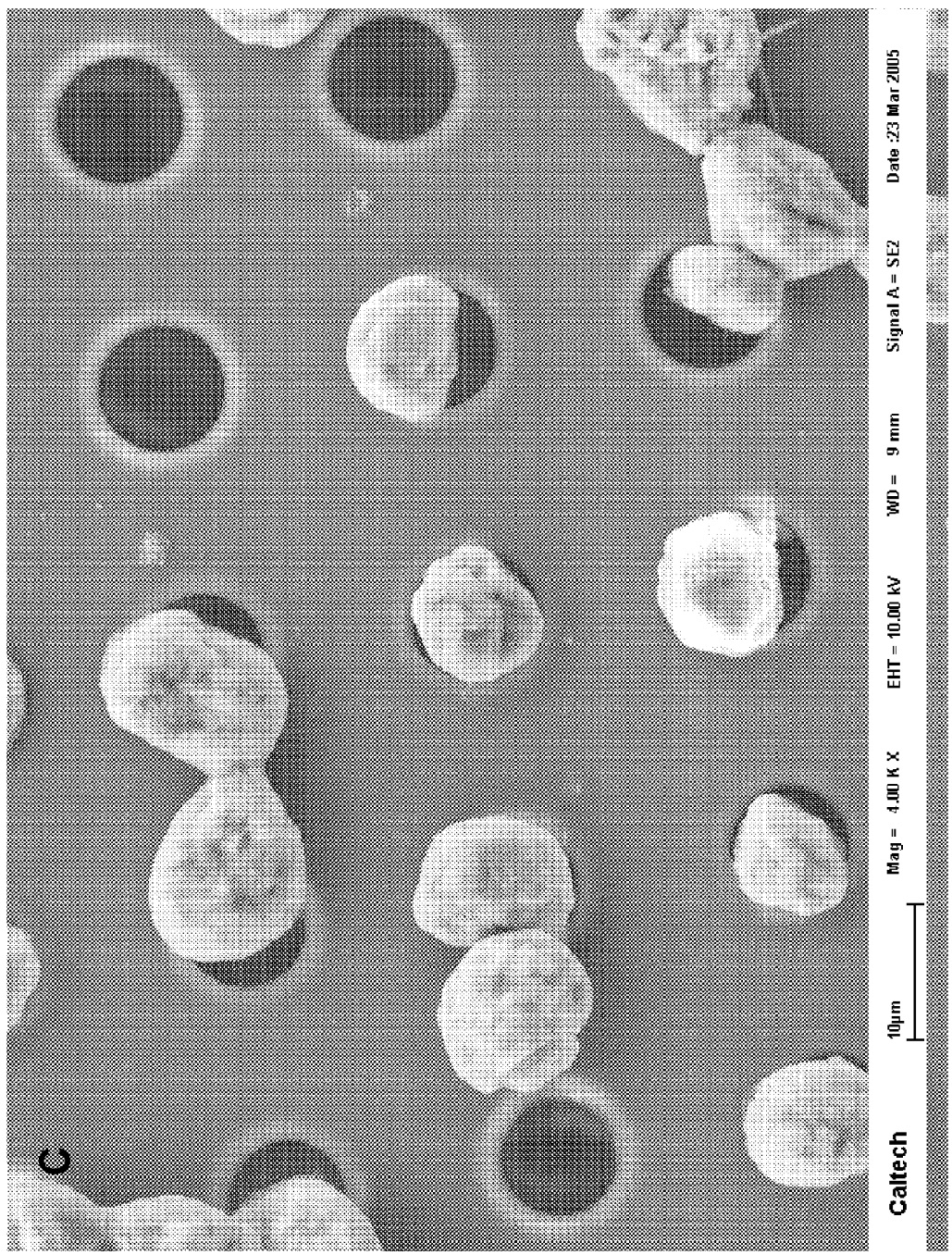
FIGS. 4C and 4D show images of parylene membrane filters with cells captured.
Figure 4D:
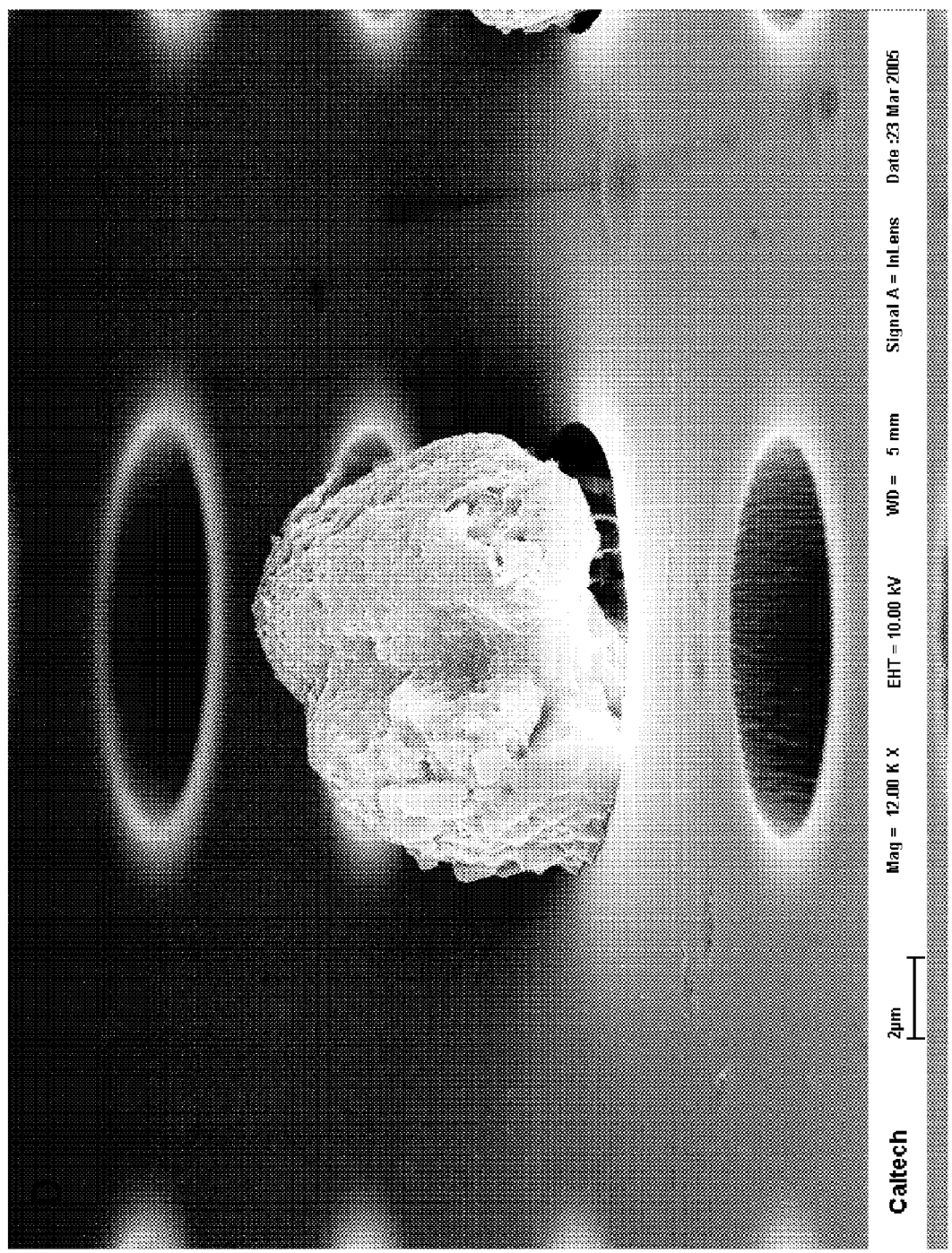

FIG. 4 illustrates the SEM images of the filter device of the present invention (FIGS. 4B-4D). FIG. 4A reveals randomly distributed holes and fused holes in the commercial filter device. The device of the present invention have a predetermined geometric design with an array of precisely controlled holes 425, 438 and 455, which have allowed an efficient and successful trapping of the tumor cells 435 and 458 (FIGS. 4B-4D). In one embodiment, prostate cancer cells are captured by the membrane filters.

The device of the present invention can be fabricated using spinning coating technology known in the art. A photoresist material is first spin-coated on a silicon wafer. Next, a thin layer of substrate is deposited on top of the photoresist material. Finally, patterning is generated by reactive ion etching (RIE). Alternatively, a thin layer of substrate can be directly deposited on top of a silicon wafer. The film is released using water or an organic solvent. Common organic solvents suitable for releasing the film include, but are not limited to, ethanol, acetone, tetrahydrofuran, dichloromethane, chloroform, $C_1$-$C_8$ hydrocarbon solvents. Parylene membranes can be prepared according to a deposition technology (see, U.S. Pat. No. 6,598,750). In some embodiments, the photomaterial used is AZ1518; the substrate is a parylene, the preferred substrate is parylene-C. Parylene membrane filters as large as 8×8 square millimeters can be fabricated.

The devices for use according to the invention also provide a pressure that can be optionally applied to the fluid to facilitate the filtration process. In one embodiment, the pressure applied to the fluid is generated by gravity. In another embodiment, the pressure applied to the fluid is generated by an electrokinetic, for example, electroosmosis, and a ratchet pump. In yet another embodiment, fluid pressure is generated using pneumatic or magneto hydrodynamic pumps. In yet a further embodiment, the pressure applied to the fluid is generated by a mechanical device. One example of a useful mechanical pressure generating device is a screw-type pumping device or a peristaltic pump.

CTCs are diagnostically as well as prognostically critical as they are associated with clinical stage, disease recurrence, tumor metastasis and patient survival following therapy. Special considerations are needed for designing a microfabricated device to address the extremely low number of CTCs in blood (on the order of 1 per >10$^{10}$ blood cells), and large sample volume required (5-7.5 ml of whole blood). Since the average size of CTCs for most common epithelial cancers is significantly larger than most blood cells, separation based on size can be very effective (Vona, G. et al., American Journal Of Pathology 156: 57-63 (2000)). While the membrane filter allows processing large sample volumes of blood; parylene provides a unique filter substrate due to its flexibility and biocompatibility.

Accordingly, in some preferred embodiments, the filters and devices according to the invention are be used in the capture, detection and characterization of subclinical tumor cell deposits in peripheral blood. These particular inventive methods can be used by oncologists to develop estimates of the risk of recurrence of a cancer for an individual patients, to tailor therapies more effectively and to monitor response to therapy. One of the most important determinants of prognosis and management of cancer is the absence or presence of metastatic dissemination of tumor cells at the time of initial presentation and during treatment (see, Lugo T G, et al., *J Clin Oncol.* 21(13):2609-15 (2003)). This early spread of tumor cells to lymph nodes or bone marrow (BM) is referred to as "disseminated tumor cells" (DTC), or as circulating tumor cells" (CTC) when in the peripheral blood (PB). It has been well established that these DTC or CTC can be present even in patients who have undergone complete removal of the primary tumor, and that this phenomenon is the basis for the later development of overt metastases in these patients. Indeed, the possible presence of early tumor dissemination is the rationale behind the use of systemic adjuvant chemotherapy in patients who have undergone definitive treatment of the primary tumor (Schabel F M, Jr., *Cancer* 39(6 Suppl): 2875-82 (1977)). The detection of DTC has proven to be a useful tool in determining the likelihood of disease progression (Braun S, *N Engl J Med.* 353(8):793-802 (2005)).

The current techniques used for DTC and CTC capture and identification have significant barriers including multiple procedural steps, handling of relatively large volumes of sample, substantial human intervention, extremely high cost and importantly, the lack of reliability and standardization for the detection methods, which have to date been based on positive markers of tumor cell detection. Whereas the detection of DTC by BM aspiration involves an invasive procedure (and hence far more likely to cause complications and lack of compliance from both patients and physicians), PB sampling offers a relatively less invasive option. Therefore, although the rates of DTC detection in the BM far exceed those for CTC detection in the PB, the investigation of PB as a target compartment is receiving more attention in recent years (see, Pierga J Y, et al., Clin Cancer Res. 10(4):1392-400 (2004); and Redding W H, et al., Lancet 2(8362):1271-4 (1983)).

One of the reasons of lesser rate of detection of CTC in blood could be the limitation of the current methodologies, which are sub-optimal to capture CTC from blood. Development of methods such as flow-cytometry, magnetic cell separation and di-electrophoresis has been proposed to increase the yield in the PB (see, Gilbey A M, et al., J Clin Pathol. 57(9):903-11 (2004)). Although in development for many years, these methods are still available essentially only in the research setting, their clinical applicability largely restricted due to expensive automation and lack of efficiency in PB. Therefore, it is clear that the development of a device capable of detecting the earliest metastatic spread of tumor in the PB (CTC) can revolutionize the approach to the disease management. Indeed, in addition to being a predictor of disease progression, detection of circulating tumor cells (CTC) in PB has been shown to be an important factor in therapeutic monitoring in patients receiving therapy for metastatic breast cancer (Cristofanilli M, et al., N Engl J. Med. 351(8):781-91 (2004) and Cristofanilli M, et al., J Clin Oncol. 23(7):1420-30 (2005)).

As discussed, BM as a source for detection of DTC has been documented for higher frequency of positive samples as compared to PB (see, Pierga J Y, et al., Clin Cancer Res. 10(4):1392-400 (2004) and Redding W H, et al., Lancet. 2(8362):1271-4 (1983)). The presence of DTC in the BM has been proven to be clinically significant in a variety of tumors (see Table 2 for summary of published data for breast cancer, and table 3 for lung cancer). The collection of BM however, is problematic and requires special invasive procedures that may be unpleasant for the patient and inconvenient for the physician.

TABLE 2

Breast cancer and bone marrow tumor cells

DT: disseminated tumor cells
DTCBM−: no DTC to bone marrow;
DTCBM+: DTC to bone marrow
*estimated 2 years recurrence rate

TABLE 1

Breast cancer and bone marrow tumor cells

| # Patients | Clinical Follow-up (years) | % Patients Recurring (number) | | p-value |
|---|---|---|---|---|
| | | DTCBM− | DTCBM+ | |
| Dearnaley, 39 | 9.5 | 31% (8/26) | 85% (11/13) | <0.05 |
| Mansi, 1991 | 350 | 2.3 | 25% (64/261) | 48% (43/89) | <0.05 |
| Cote, 1991 | 49 | 2* | 16% (5/31) | 54% (7/13) | <0.04 |
| Diel, 1992 | 211 | 2 | 3% (4/130) | 27% (22/81) | 0.0001 |

TABLE 1-continued

Breast cancer and bone marrow tumor cells

| # Patients | Clinical Follow-up (years) | % Patients Recurring (number) | | p-value |
|---|---|---|---|---|
| | | DTCBM− | DTCBM+ | |
| Diel, 1996 | 727 | 3 | 8% (34/412) | 35% (109/315) | <0.001 |
| Braun, 2000 | 552 | 4 | 8% (28/353) | 39% (79/199) | |
| Gebauer, 2001 | 393 | 6 | 20% (46/227) | 35% (59/166) | <0.001 |
| Gerber, 2001 | 554 | 4.5 | 9% | 24% | 0.0001 |

DT: disseminated tumor cells
DTCBM−: no DTC to bone marrow;
DTCBM+: DTC to bone marrow
*estimated 2 years recurrence rate
Dearnaley DP, et al., Eur J Cancer 27(3): 236-9 (1991).
Mansi JL, et al., Eur J Cancer 27(12): 1552-5 (1991).
Cote RJ, et al., J Clin Oncol. 9(10): 1749-56 (1991).
Diel IJ, et al., J Clin Oncol. 10(10): 1534-9 (1992).
Diel IJ, et al., J Natl Cancer Inst. 88(22): 1652-8 (1996).
Braun S, et al., N Engl J Med. 342(8): 525-33 (2000).
Gebauer G, et al., J Clin Oncol. 19(16): 3669-74 (2001).
Gerber B, et al., J Clin Oncol. 19(4): 960-71 (2001).

TABLE 3

Lung cancer and bone marrow tumor cells

| Antibodies | No Patients in study | No Patients DTCBM+ (%) |
|---|---|---|
| Non-small cell lung cancer: | | |
| Pantel, 1993 | CK18 | 82 | 18 (22%) |
| Cote, 1995 | CK | 43 | 17 (40%) |
| Pantel, 1996 | CK18 | 139 | 83 (59.7%) |
| Ohgami, 1997 | CK18 | 39 | 15 (39%) |
| Small cell lung cancer | | |
| Leonard | EMA, CK | 12 | 8 (67%) |

Pantel K, et al., Lancet 347(9002): 649-53 (1996).
Ohgami A, et al., Ann Thorac Surg. 64(2): 363-7 (1997).
Leonard RC, et al., Cancer Res. 50(20): 6545-8 (1990).

Peripheral blood (PB) acts as a vector carrying the tumor cells to every anatomic site. Since tumor cell dissemination is considered an early event in the multi-phasic metastatic process, the prospect of detecting tumor cells in the PB before clinical evidence of distant, overt metastasis has been of interest for over a decade. Unfortunately, the yield of CTC from PB is extremely low (see, Pierga J Y, et al., Clin Cancer Res. 10(4):1392-400 (2004) and Redding W H, et al., Lancet. 2(8362):1271-4 (1983)). Redding et al. found that 28.2% patients with breast cancer showed extrinsic cancer cells in their BM, but only 2.7% of these patients had detectable cells in their PB. Most of the studies looking for the presence of early metastases in the blood have focused on using molecular methods. Nonetheless, many studies have sought to use ICC as well for detection of CTC in PB (see, Bischoff J, et al., Recent Results Cancer Res. 162:135-40 (2003), and the need of using enrichment techniques has become more apparent.

However, enrichment techniques are time consuming and there is no guarantee that cells will not be lost in the processing. Therefore, a procedure that directly extracts cells from PB with minimal procedural steps is vital to make this prognostic indicator practical in the clinical setting. Accordingly, in one aspect this invention provides a parylene membrane filter, device, method, and/or an integrated system where a parylene filter membrane is located in a device in which cell fractionation bypasses the need for gradient separation. This allows increased cellular yield from PB.

We analyzed PB samples from 133 patients using other methods with stage II, II or IV breast cancers. This preliminary data show, that the frequency of DTC and CTC is generally low. Even in metastatic breast cancer in BM aspirates the incidence was 40%. Our data further support the findings by Redding et al. (Redding W H, et al., *Lancet*. 2(8362): 1271-4 (1983) that the frequency of DTC is higher in BM than in PB. These findings indicate the need for effective enrichment methods.

| Stage | Number of Patients Positive/ Number of Patients | |
|---|---|---|
| | BM | PB |
| II | 0/30 (0%) | 0/30 (0%) |
| III | 4/65 (6%) | 1/65 (2%) |
| IV | 15/38 (40%) | 5/38 (13%) |

Incidence of tumor cell samples from patients with breast cancer who had both bone marrow and peripheral blood tested by stage.

In preferred embodiments, the parylene membrane filters are used to detect CTCs in PB from patients with prostate, bladder and breast cancer. The detection can be used in the diagnosis and prognosis of these conditions or in evaluating the response to therapy. Breast Cancer is the most commonly diagnosed form of cancer and is the second most common cause of cancer related death in women. Although increased patient awareness and improved screening techniques now permit early detection of localized and resectable tumors, many women still die from recurrent breast carcinoma suggesting that a substantial number of patients already have distant DTC at the time of diagnosis. The clinical significance of DTC to the BM has long been established by us as well as others (see, Braun S, *N Engl J. Med*. 353(8):793-802 (2005) and Cote R J, et al., *J Clin Oncol*. 9(10):1749-56 (1991) (3, 20)

Prostate cancer is the most commonly diagnosed form of cancer in man, and is the second most common cause of cancer related death in men, second only to lung. Overall, 99% of men diagnosed with prostate cancer survive at least 5 years. For the men whose cancer has already spread to distant parts of the body when it is found, 34% will survive at least 5 years. Despite substantial treatment options, there is still a need for improvement. The clinical relevance of DTC and CTC has been shown in many prior studies (see, Freeman J A, et al., *J Urol*. 154(2 Pt 1):474-8 (1995); Weckermann D, et al., *J Clin Oncol*. 17(11):3438-43 (1999); Allard W J, et al., *Clin Cancer Res*. 15; 10(20):6897-904 (2004); and Chen et al., *Urology* 65(3):616-21 (2005)).

Bladder cancer: Transitional cell carcinoma is the second most common genitourinary malignancy in US and third most common cause of death among genitourinary tumors. Only a proportion of patients at risk will respond to therapy. The significance of occult metastatic spread of bladder cancer in clinical management of the disease has been recognized for over a decade now. The 5-year survival rate for bladder cancer (which reflects overall cure rates) is proportional to the pathological stage but is approximately 50%, with patients dying from metastatic disease. (see, Lerner S P, et al., *Urol Clin North Am*. 19(4):713-23 (1992) and Hofmann T, et al., *J. Urol*. 169(4):1303-7 (2003)).

Many markers can be used in a multimarker analysis of breast cancer specimens. Breast cancer represents a much studied disease for expression of different markers on CTC. For instance, the presence of hormone receptors for estrogen (ER) and progesterone (PR) in primary tumors has been shown to be positively correlated with outcome of breast cancer patients and are currently among the strongest prognostic factors of breast cancer. Her 2 neu: HER-2/neu is a proto-oncogene that encodes a transmembrane receptor belonging to the family of epidermal growth factor receptors. Her-2/neu (Her-2) overexpression, usually attributable to HER-2 gene amplification, occurs in 20-25% of breast cancer patients and is associated with a poor prognosis. Recently, it has been demonstrated, that even >than 30% of patients with no Her-2 neu overexpression in primary tumor acquire this characteristic on CTC and indicate the need of targeted therapy. The putative breast cancer stem cell phenotype: has been defined as CD 44+CD24−/low. Cells with this phenotype have been identified as cells capable of self-renewal and tumorigenicity. The hypothesis that solid tumors raise from tumor stem cells has gained on importance in recent years, and superficial markers, which are reflecting the phenotype of putative stem cells, can be used to enrich the putative stem cell population, to further characterize these cells.

Stem cell antigen-1 (Sca 1): Stem cell antigen 1 (Sca-1) appears to be preferentially expressed in mammary stem and/or progenitor cells. There is evidence for upregulation of Sca 1 in breast cancer. Sca 1 can also be used to enrich for murine prostate cells capable of regenerating tubular structures containing basal and luminal cell lineages in a dissociated cell prostate regeneration system.

Proliferation and apoptosis markers can also be used according to the methods of the invention. Survivin: Survivin expression has been upregulated in cancer tissues, and present in different cancer cell lines. The role of survivin has been connected with prolonged survival of cancer cells and resistance to therapy. It is member of inhibitor apoptosis family. It may even play an important role in carcinogenesis. M30: M30 is an antibody that has been shown to detect fragmented CK 18, a characteristic of apoptotic cells, and has been used to demonstrate apoptosis in tumor tissue. Ki67: Ki67 is an antigen that represents proliferating cells. Circulating tumor cells have been shown to have low level of Ki67 expression, similarly to DTC in BM. Given the possibility of sub-populations within CTC, this marker may be useful in characterizing and profiling CTC, especially as a member of a panel of markers.

A variety of immunocytochemistry (ICC) techniques may be used to DTC and CTCs. For instance, immunological detection of occult metastatic cells commonly employs antibodies specific for low-molecular weight cytokeratin (CK) proteins to distinguish the epithelial tumor deposits from normal lymph node elements and BM or PB. A cocktail of two anti-CK antibodies, AE1 and CAM5.2 (which in combination recognize the predominant intermediate filament proteins in simple epithelial cells) can be used (see, Chaiwun B, et al., *Diag Oncol* 2:267-76 (1992)). One of the primary difficulties with current ICC techniques for detecting DTC is that they are labor intensive and time-consuming, factors that may limit their general availability. In addition, the technology is not amenable to assess multimarkers on a single cell.

In addition, Quantum Dot (QD)-based ICC may be used. The most recent work with QDs and spectral imaging has broadened the utility of ICC by enable multimarkers to be assessed on a single cell (see, Jaiswal J K, et al., *Nat Methods*. 1(1):73-8 (2004)). QDs can be made from a variety of inorganic compounds (Gao X, et al., *Curr Opin Biotechnol*. 16(1): 63-72 (2005)). The QD nanocrystals usually used for ICC are made from a 10-nm cadmium and selenium (CdSe) core that is then coated with a semiconductor layer (ZnS) to improve the optical qualities of the material. This core and semiconductor layer particle is then coated with an additional polymer shell. This additional outer polymer shell enables the nanocrystal to be conjugated with a biological molecule at the same time maintaining their optical properties. These QD conjugates are multivalent such that more than one biomolecule can be attached to a single QD. Compared to immunofluorescent dyes, QDs are brighter, not prone to photobleaching, come in a wide range of colors, and their emission can be tuned to any desired wavelength by modulating the size of the particle. The QDs also have narrow emission spectra enabling more colors to be used with minimal channel overlap, and multiple colors can be simultaneously emitted by a single light source. The properties of QDs have been reviewed by Watson A, et al., *Biotechniques* 34(2):296-300, 2-3 (2003).

QDs have been heralded as among the most promising techniques for cellular imaging, however, there were questions whether QDs could specifically and effectively label molecular markers at the subcellular level. QD-based probes are effective in cellular imaging in multiplex target detection. Spectral imaging technology can further enhance the utility of QDs in ICC. This technology, described later in greater details is based on color differentials such that a different chromogen is used for each of the many markers tested, and a specially designed software serially "erases" a given chromogen from the microscope image to assess each marker on an individual basis, even when the color differences are not discernable to the naked eye. This technology can provide information on multiple marker status on specific individual cells.

A potentially more sensitive molecular approach for detection of DTC is the reverse-transcriptase polymerase chain reaction (RT-PCR), which has been applied to several malignancies employing a variety of marker transcripts as targets. Since the first study by Smith and colleagues in 1991, many authors have reported molecular diagnoses in the lymph nodes, blood, and BM in cancer patients. Application of RT-PCR in regional and sentinel lymph nodes has been described for a number of cancers, including melanoma, colorectal cancer, and cancers of prostate, breast and lung (see, Smith B, et al., *Lancet* 338(8777):1227-9 (1991); Shariat S F, et al., *J Urol*. 170(3):985-9 (2003); Sakaguchi M, et al., *Ann Surg Oncol*. 10(2):117-25 (2003); Wallace M B, et al., *Am J Respir Crit Care Med*. 167(12):1670-5 (2003); Blaheta H J, et al., *J Invest Dermatol*. 114(4):637-42 (2000); Shariat S F, et al. *J Clin Oncol*. 22(6):1014-24 (2004)) and Corradini P, et al., *Ann Oncol*. 12(12):1693-8 (2000)). Many of these compare the ICC-based detection with RT-PCR for sensitivity and conclude that RT-PCR may provide enhancement in detection, provided the target markers are sufficiently specific. Various formats of RT-PCR assays (see, Burchill S A, et al., *Br J Cancer* 71(2):278-81 (1995); Aquino A, et al., *J Chemother*. 14(4):412-6 (2002); and Wiedswang G, et al. *J Clin Oncol*. 21(18):3469-78 (2003)) have also been used for detection of DTC in BM in patients with cancers of breast, colon, lung, etc. With some exceptions of organ-specific markers like maspin or mammaglobin for breast cancer or uroplakins for bladder cancer most of the molecular targets used in these RT PCR assays have been shown to lack the requisite specificity due to illegitimate expression in non-target hematopoietic cells as shown by us and many other investigators (see, Grunewald K, *Lab Invest*. 82(9):1147-53 (2002); Bostick P J, et al., *N Engl J Med*. 339(22):1643-4 (1998); Osman I, et al. Int J Cancer 111(6):934-9 (2004); Pelkey T J, et al., *Clin Chem*. 42(9):1369-81 (1996); Raj G V, et al., *Cancer* 82(8):1419-42 (1998); and Ghossein R A, et al., *Clin Cancer Res*. 5(8):1950-60 (1999)). RT-PCR has also been used to enhance the sensitivity of detection in PB in a variety of cancers including prostate cancer, breast cancer, gastrointestinal tract cancers, melanoma, colorectal cancers, head-and-neck cancer, etc. (see, Partridge M, et al., *Clin Cancer Res.;* 9(14):5287-94 (2003); Palmieri G, et al., *J Clin Oncol*. 21(5):767-73 (2003); Yokoyama S, Yamaue H. *Arch Surg*. 137(9):1069-73 (2002); and Li S M, et al., *J. Urol*. 162(3 Pt 1):931-5 (1999)) although the same concerns of non-specificity due to the illegitimate transcription of target genes in the non-target hematopoietic cells as described above exist, which have hampered the use of these assays in routine clinical diagnostics.

The identification of tumor cells by ICC has traditionally been comprised of a single marker or a cocktail of markers that identify epithelial cells. All markers used to co-express to some degree on hematopoietic cells present in the samples. This has led to subjectivity and disagreement in assessing for the presence of tumor cells. Positive and negative selectors address this issue. The positive markers identify the epithelial cells, while the negative markers identify the hematopoietic cells. The tumor cells can be determined to not co-express the hematopoietic markers. In this way all cells that express the negative selector can be classified as non-tumor cells, regardless of whether or not they express the positive selector (FIG. 13 in res design). ICC using negative and positive selectors identifies false positives and greatly increases the selectivity over traditional single positive selection ICC. Previously, false positives were distinguished from true positives on the basis of morphology alone, a subjective assessment that is difficult in these types of cell preparations.

A variety of epithelial antigens (Positive Selector), as known to one of ordinary skill in the art, are suitable. For instance, Cytokeratins (CK) are intermediate filament proteins which are normal components of epithelial cytoskeleton, and hence are commonly used to identify carcinoma in non-epithelial compartments. The antibody cocktail typically used in ICC detection of DTC is raised against peptides from both acidic and basic CK; such as the combination of anti-bodies AE-1 (reactive with CK-10, 14, 16 and 19) and CAM 5.2 (reactive with CK-7 and CK-8) used by us ((64) see Appendix) and many other investigators (27, 64-66).

Epidermal Growth Factor Receptor (EGF-R) can also be used. Over-expression of epidermal growth factor receptor (EGF-R, product of c-erbB-1 proto-oncogene) is associated with poor prognosis in patients with cancer, and identifies breast, bladder, gastric, cervix, ovary and NSC lung cancers, making it a significant prognosticator. Since EGF-R is not expressed in hematopoietic cells, it is a particularly suitable marker for detection of circulating tumor cells in cancer patients.

Epithelial Cell Adhesion Molecule (EpCAM) is also suitable. EpCAM is known variously as Human Epithelial Antigen (HEA), BerEP4: GA-733.2 or 17-1A, antibodies to this surface antigen show a very broad pattern of reactivity with human epithelial tissues from simple epithelia to basal layers of stratified non-keratinized squamous epithelium and epidermis. It does not react with mesenchymal tissue, including lymphoid tissue.

A variety of hematopoietic antigens (Negative Selector) are also suitable: CD 45 is a hematopoietic cell marker for ICC: CD 45 is also known as leukocyte common antigen (LCA) precursor and is a receptor glycoprotein that ranges in size from 180 to 220 kDa. The antigen is present on the surface of all human leukocytes. An antibody to CD45 immunoreacts with the majority of white blood cells (WBCs) present in the blood and BM (75). CD 68 is a primarily intracellular 110 kDA lysosomal glycoprotein, which can also be found on the surface of macrophages, monocytes, neutrophils, eosinophils and large lymphocytes.

In addition Tumor-/Tissue-restricted markers are also suitable. Mammaglobin: The mammaglobin gene is a human breast cancer-associated gene. The gene encodes a 10 kDa glycoprotein and is distantly related to a family of epithelial secretory proteins. Mammaglobin is a mammary-specific member in the uteroglobin family and is known to be over-expressed in human breast cancer. It, along with Maspin, is currently under investigation at the transcript level as a potential marker to detect circulating tumor cells in the PB from patients with breast cancer.

PSA: Prostate Specific Antigen (PSA) is the classical indicator for transformed prostate tissue. It is a serine protease that hydrolyzes the major seminal protein, the seminal plasma mobility inhibitor precursor, or semenogelin I, which leads to semen liquification. Serum PSA level above 4 ng/ml is an aid in the early detection of prostate cancer. PSA expression is useful in detection of DTC/CTC.

Uroplakin Family Markers—Molecular markers specific for a single type of epithelium are rare. Bladder epithelium is unique in its expression of family of transmembrane proteins uroplakins (UP). UP expression can be tracked at both RNA and protein levels in primary bladder cancer tissues as well as metastatic legions. The expression of UP transcripts in circulating and metastatic urothelial cancer cells can be detected. Uroplakin II can be a specific marker for the assessment of perivesical extension and lymph node status after radical cystectomy and, at the transcript level, for detection of urothelial cancer cells in PB. UPII transcripts are a preferred marker for bladder cancer specimens.

EXAMPLES

The following examples are offered to illustrate, but not to limit the claimed invention.

Example 1

Parylene Membrane Performance

The design, fabrication and testing of a parylene membrane filter device according to the invention is described. Even without much optimization, the device demonstrated 89% recovery and 9 log 10 enrichment to out-perform most current methods used in the field (see, Lara, O., et al., *Experimental Hematology*, vol. 32: 891-904 (2004)). Moreover, less than 10 minutes can be required for each sample separation, compared to current multistep processing needing more than 1 hour.

Two filters as shown in FIG. 1 were tested in this initial study. The first parylene membrane filter had an array of circular holes with a 10 micron diameter and the second parylene membrane filter had an array of 8 by 14 micron oval holes. To fabricate these membrane filters, photoresist AZ1518 was spin-coated on silicon wafer, followed by 10 micron parylene-C deposition and patterning with RIE. Finally the whole film was acetone released overnight. The individual membrane filter was sandwiched between two PDMS chambers and clamped tightly with a jig (FIG. 2). FIG. 3 compares the SEM pictures of commercially available poly-carbonate membrane filter used for rare tumor cell detection (FIG. 3A) and these two microfabricated parylene membrane filter (FIG. 3 B,C,D). The commercial membrane filter shows randomly and sparsely distributed holes, with many noticeably fused, resulting in larger openings and reduced fidelity.

For testing, a first syringe was each inserted into the top port accessing a first PDMS chamber and a second syringe was inserted into the bottom port accessing a second PDMS chamber. Sample was loaded using the top syringe and dispensed manually to traverse the filter. The flow-through is collected by the bottom syringe. Further rinses with buffered saline were performed similarly.

The filtration of prostate cancer cells was conducted by inserting each syringe into ports of the top and the bottom chambers as described. A sample was loaded using the top syringe and dispensed manually to traverse the filter. The filtrate was collected by the bottom syringe. The prostate cancer cells were cultured cells derived from human metastatic prostatic adenocarcinoma (LNCaP). These cells were stained with hematoxylin, and serially diluted in buffered saline to the desired numbers for device testing. The average diameter of LNCaP cells was measured to be 19 microns×3 microns.

Parylene membrane filters having both circular and oval holes were tested. The recoveries for circular and oval designs were 87.3%±7.0% and 89.1%±7.0%, respectively (Tables 1 and 2). For detection limit tests, the cell numbers were lowered to less than 10 cells per milliliter. Tables 3 and 4 demonstrate that the device can capture as few as 4 tumor cells per milliliter.

TABLE 1

Recovery Test for Circular Hole Design

|  | 1 | 2 | 3 | 4 | 5 |
|---|---|---|---|---|---|
| Tumor Cells Added | 402 | 402 | 402 | 402 | 402 |
| Cells Recovered | 346 | 400 | 344 | 327 | 339 |
| Cells in Flow-Through | 2 | 1 | 0 | 1 | 0 |

TABLE 2

Recovery Test for Oval Hole Design

|  | 1 | 2 | 3 | 4 | 5 |
|---|---|---|---|---|---|
| Tumor Cells Added | 86 | 86 | 86 | 86 | 86 |
| Cells Recovered | 79 | 84 | 74 | 78 | 68 |
| Cells in Flow-Through | 0 | 0 | 0 | 0 | 0 |

TABLE 3

Capture Limit Test for Circular Hole Design

|  | 1 | 2 | 3 | 4 | 5 |
|---|---|---|---|---|---|
| Tumor Cells Added | 4 | 4 | 4 | 4 | 4 |
| Cells Recovered | 4 | 3 | 3 | 3 | 3 |
| Cells in Flow-Through | 0 | 0 | 0 | 0 | 0 |

TABLE 4

Capture Limit Test for Oval Hole Design

|  | 1 | 2 | 3 | 4 | 5 |
|---|---|---|---|---|---|
| Tumor Cells Added | 8-9 | 8-9 | 8-9 | 8-9 | 8-9 |
| Cells Recovered | 7 | 7 | 6 | 9 | 7 |
| Cells in Flow-Through | 0 | 0 | 0 | 0 | 0 |

Figure 5:
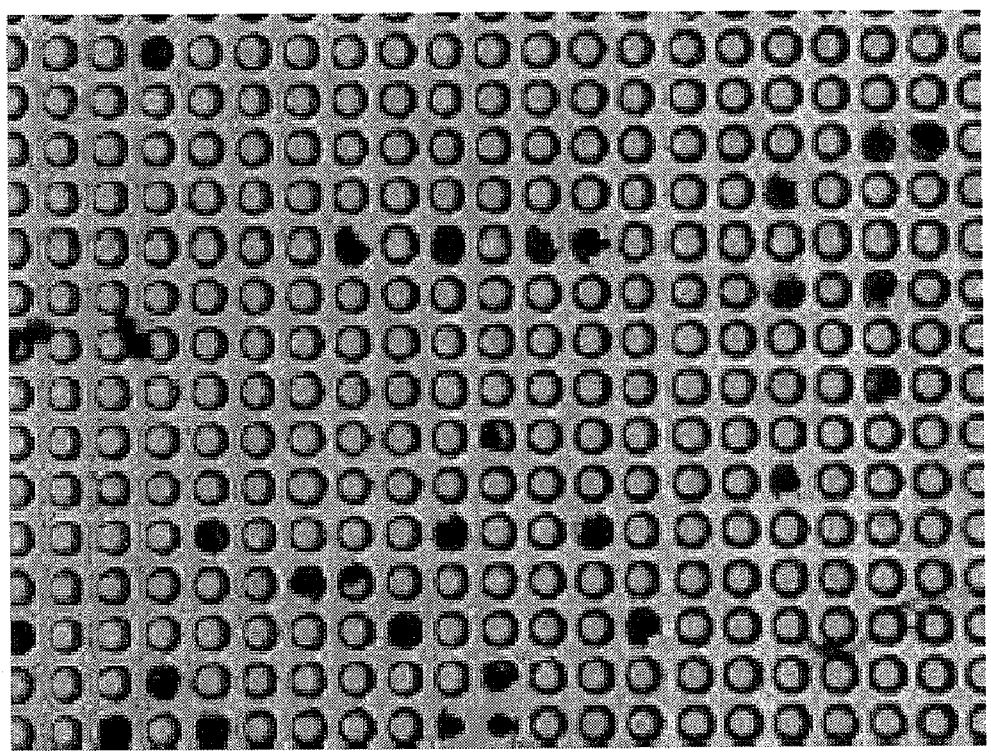
FIG. 5 shows hematoxylin stained tumor cells captured on the surface of a parylene membrane filter.
Figure 6:
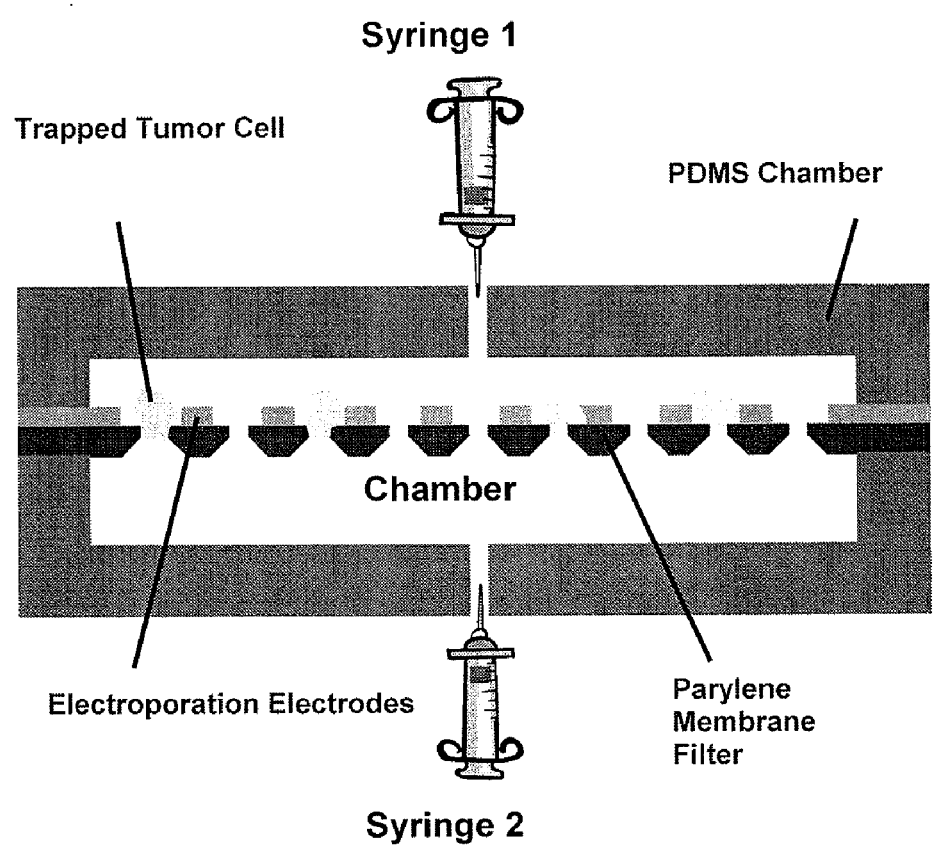
FIG. 6 presents a proposed design of integrated on-chip parylene membrane filter for tumor cell capture and detection.

The device performance was also tested by spiking known numbers of LNCaP cells in peripheral blood from healthy donors. The captured cells were captured on the parylene membrane filter (see, FIG. 5). Similar to experiments with buffered saline, the oval filter design resulted in 89.0%±9.5% recovery from blood (Table 5):

TABLE 5

Recovery for Tumor Cells Spiked in 1 ml Whole Blood with Oval Hole Design

|  | 1 | 2 | 3 | 4 | 5 |
|---|---|---|---|---|---|
| Tumor Cells Added | 41 | 41 | 41 | 41 | 41 |
| Cells Recovered | 33 | 35 | 42 | 39 | 34 |
| Cells in Flow-Through | 0 | 0 | 0 | 0 | 0 |

Example 2

Capture and Detection of Bladder Cancer Cells in Urine

Background to the Example: Bladder cancer is an important public health problem. With its incidence continuing to increase, bladder cancer is now the fifth most common cancer in US, with an estimated 56,500 new cases predicted for 2002, of which 12,600 patients are expected to die of the disease. Cystoscopy is an invasive and relatively costly technique for detecting bladder cancer. The method can be inconclusive at times, particularly in cases of cystitis. A simpler, noninvasive assay for detecting recurrence of bladder cancer is needed.

A clinically useful urinary marker assay should be easy to perform, have minimum requirements for sample processing and be highly sensitive and specific in diagnosis. Urinary cytology can serve as an excellent test for screening because it is simple, non-invasive and inexpensive; but, in general, experience in the field has generally demonstrated the limitations of urinary cytology in detecting tumors, especially in low grade tumors in which the sensitivity varies. When others have evaluated the performances of the combination of ultrasound and urine cytology versus cystoscopy in the follow-up of bladder tumors, they found the combination to be sufficient for systematic surveillance in superficial tumors or low-grade bladder tumors as an alternative to cystoscopy.

Urine cytology is traditionally used to detect urothelial neoplasia in patients with hematuria, in patients with a history of bladder carcinoma, or in patients at high risk of developing bladder carcinoma (screening workers exposed to aromatic amines or cadmium).

The overall sensitivity of urinary tract cytology in one large study reported in the literature was 83 percent (reported sensitivity in the literature varies from 47 to 97 percent). The sensitivity varies considerably with the grade of the neoplasm. Papillomas and grade I carcinomas can not be reliably diagnosed. The sensitivity for grade II carcinomas (suspicious and positive) is 80 percent and grade III (suspicious and positive) 94 percent. Urinary tract cytology has a special role to play in carcinoma in situ. These tumors are often difficult to visualize at cystoscopy but readily shed cells. The sensitivity for carcinoma in situ is 98 percent.

Specificity of urinary tract cytology is reported to be good with a false positive rate of 3 percent. In addition to examination of the sediment for malignant cells, casts, renal tubular epithelial cells, dysmorphic red blood cells, and crystals may be seen in the urine of patients with renal parenchymal disease.

The Example: Accordingly, for this example, a sample of urine is obtained from a patient having or suspected of bladder cancer. The sample is passed through a parylene membrane filter comprising holes of a predetermined geometric design which is capable of capturing bladder tumor cells (e.g., shed carcinoma in situ cells). The captured cells are stained with one or more labeled antibodies capable of binding to a bladder tumor antigen (e.g., UPII (uroplakin II)) which is overexpressed in bladder cancer. The stained cells are identified and counted. The presence or absence and or number of cells which are positively identified as bladder cancer cells are used to determine the prognosis or diagnosis of the patient. The cells may be further characterized as to phenotype to assess their potential for metastasis.

Example 3

Enrichment and Capture of Circulating Endothelial Cells in Blood

In this example, circulating endothelial progenitor cells are captured and detected.

Background to the Example: The number of circulating endothelial progenitor cells in an individual's blood—the precursor cells to those that line the insides of blood vessels—may be an indicator of overall cardiovascular health. The endothelial cells lining the blood vessels provide essential communication between the vessels themselves and circulating blood cells, allowing the blood to flow smoothly. In diseases such as atherosclerosis, however, the endothelial layer becomes damaged and the vessels do not function efficiently. Until recently, scientists believed that nearby endothelial cells were recruited to help repair damaged blood vessels or form new ones to circumvent blocked vessels or to repair wounds. Evidence now indicates, however, that endothelial progenitor cells, probably generated in the bone marrow, circulate in the bloodstream and are recruited to form new blood vessels or repair damaged ones. Endothelial cells generated in the bone marrow contribute to continuous repair of the endothelial lining of blood vessels. Accordingly, a lack of these cells may lead to vascular dysfunction and the progression of cardiovascular disease.

Circulating endothelial progenitor cells (CECs) are generally present in healthy blood at a frequency of perhaps 0.5-2 cells/ml. Increased numbers of CECs, as opposed to a decrease in endothelial progenitor cells, often up to 10-fold or more, are found in diseases and conditions associated with vascular perturbation or damage. Moreover, increased numbers of endothelial cells are observed in peripheral blood of cancer patients. These circulating endothelial progenitor cells (CECs) may contribute to the formation of blood vessels in the tumor or reflect vascular damage caused by treatment or tumor growth.

The Example: Accordingly, in this example, a sample of blood is obtained from a patient suspected of having a vascular disorder (e.g., arteriosclerosis, a macrovascular or microvascular disorder) or cancer. The sample is passed through a parylene membrane filter comprising holes of a predetermined geometric design which is capable of capturing CECs. The captured cells are stained with one or more labeled antibodies capable of selectively binding to the CECs. The stained cells are identified and counted. With respect to vascular disorders, a reduced CEC count is further suggestive of a decreased capability to heal damage to the vascular endothelium. An increased count is further diagnostic of a vascular injury or malignancy.

Example 4

Hematopoetic Stem Cells in Cord Blood

Background to the Example: Hematopoetic stem cells are primitive cells with the ability to both multiply and separate into specific types of cells. The body's white blood cells, red blood cells and platelets are just a few examples of derivatives from these stem cells. Patients suffering from a malignant disease such as leukemia may undergo treatment with radiation or chemotherapy to destroy the cancer cells alive in their body. Radiation and chemotherapy treatments are often successful in destroying the cancer cells, however, in the process; they may also destroy the patient's healthy cells and bone marrow.

Bone marrow is essential for the production of blood cells. If the bone marrow is destroyed, either from a malignant, non-malignant or genetic disorder, a stem cell transplant becomes necessary. Transplanted stem cells re-populate the bone marrow thereby replenishing the body's supply of cells. And these hematopoetic stem cells can be found in cord blood.

The Example: Accordingly, in one aspect, cord blood is passed through a parylene membrane device which comprises a stacked series or parylene membrane comprising a first membrane which allows red blood cells to pass through and a second membrane which captures hematopoetic stem cells. A sterile physiologically acceptable rinse media which does not harm the viability of the captured cells is passed through the device. The captured stem cells are recovered from the device, optionally cultured ex vivo, and administered to a patient in need of them.

Example 5

Determination of Size Distributions of Cells or Particles

Background to the Example: Size distribution can be measured using a filter device having a plurality of parylene membrane filters in parallel. Each filter differs from others by geometrical designs which provide a unique critical separation threshold size. Particle or cell size distribution in a sample can be measured by counting particle numbers at the outlet for each filter.

Size distribution can be measured using a filter device having a plurality of parylene membrane filters stacked in a series progressing from larger holes to smaller holes such that each defines a retention zone of progressively smaller particle sizes. Each filter can differs from others by the shape of the holes as well as cross sectional area such that they vary in their critical separation properties. Particle or cell distribution in a sample can be measured by counting particles retained in each zone or retrieved from each zone. The design will be similar to that multiple filters with different threshold hole sizes will be stacked in series such that cells of different sizes will be sorted out in different zones.

The Example: Accordingly, a sample is obtained which is suspected of having particles or cells of different sizes which need to be separated by size. The sample is passed through a parylene filter device having a plurality of parylene membrane filters stacked in a series progressing from larger holes to smaller holes such that each defines a retention zone of progressively smaller particle sizes. The retention of cells at the various membranes provides a count of the cells or particles according to their size distribution.

Each publication, patent application, patent, and other reference cited herein is incorporated by reference in its entirety for all purposes to the extent that it is not inconsistent with the present disclosure. In particular, all publications cited herein are incorporated herein by reference in their entirety for the purpose of describing and disclosing the methodologies, reagents, and tools reported in the publications that might be used in connection with the invention. Nothing herein is to be construed as an admission that the invention is not entitled to antedate such disclosure by virtue of prior invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for isolating a cancer cell from a urine sample, the method comprising passing the urine sample under pressure through at least a first membrane filter consisting of
   a parylene substrate, a portion of the membrane filter having a first plurality of holes having a predetermined geometric design, wherein the first plurality of holes is between 5000 and 40,000 per square millimeter;
   a pressure generating device coupled to the filter for applying pressure to a sample to be filtered; and
   a housing surrounding the membrane filter wherein the portion is suspended free of the housing, thereby isolating the cancer cell from the urine sample.

2. The method of claim 1, wherein the cancer cell has a cross-sectional area greater than each of the first plurality of holes and is retained by the membrane filter.

3. The method of claim 1, wherein the cancer cell is too small to be retained by the membrane filter.

4. The method of claim 1, wherein the urine sample further comprises a cell of a second type and the predetermined geometric design selectively allows the cells of the second type to pass through the membrane filter while selectively limiting the passage of the cancer cells.

5. The method of claim 1, wherein the first plurality of holes are in the form of an array.

6. The method of claim 1, wherein the first plurality of holes provide an opening area ratio for the first membrane of from 5% to 45%.

7. The method of claim 1, wherein the holes having a predetermined geometric design are circles, ovals, or polygons.

8. The method of claim 1, wherein each of the plurality of holes has a cross sectional area ranging from about 75 square microns to about 500 square microns.

9. The method of claim 1, wherein the cancer cell is a bladder cancer cell.

10. The method of claim 1, wherein after the fluid passes through the first membrane filter the cancer cell is retained on the upstream surface of the membrane filter.

11. The method of claim 10, further comprising detection of the retained cancer cell.

12. The method of claim 1, wherein the sample is passed through a second membrane filter, wherein the second membrane filter comprises a second parylene membrane having a second plurality of holes of a second predetermined geometric design, wherein each of the plurality of holes of the second parylene membrane have a cross-sectional area which is smaller than the cross-sectional area of each of the holes of the first parylene membrane, and the cancer cell passes through the first membrane filter and is retained on the surface of the second membrane filter.

13. The method of claim 11, wherein the retained cancer cell is detected by contacting the retained cancer cell with a tissue-specific or cell-type specific antibody having a label.

14. The method of claim 11, wherein the retained cancer cell is contacted with a reagent capable of detecting a tumor associated antigen or a nucleic acid encoding the tumor associated antigen.

* * * * *